United States Patent

Sugino

(10) Patent No.: US 9,519,534 B2
(45) Date of Patent: Dec. 13, 2016

(54) INFORMATION PROCESSING IN RESPONSE TO FAILURE OF APPARATUS, METHOD, AND STORAGE MEDIUM

(71) Applicant: FUJITSU LIMITED, Kawasaki-shi, Kanagawa (JP)

(72) Inventor: Masatoshi Sugino, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/483,346

(22) Filed: Sep. 11, 2014

(65) Prior Publication Data

US 2015/0161032 A1 Jun. 11, 2015

(30) Foreign Application Priority Data

Dec. 5, 2013 (JP) .................................. 2013-251848

(51) Int. Cl.
G06F 11/07 (2006.01)

(52) U.S. Cl.
CPC ....... *G06F 11/0778* (2013.01); *G06F 11/0721* (2013.01); *G06F 11/0787* (2013.01)

(58) Field of Classification Search
None
See application file for complete search history.

(56) References Cited

U.S. PATENT DOCUMENTS

| 4,930,128 A | * | 5/1990 | Suzuki | G06F 12/08 714/16 |
| 5,664,155 A | * | 9/1997 | Elko | G06F 11/07 707/999.202 |
| 5,758,057 A | * | 5/1998 | Baba | G06F 11/0727 711/114 |
| 5,983,293 A | * | 11/1999 | Murakami | G06F 3/0613 707/999.202 |

(Continued)

FOREIGN PATENT DOCUMENTS

| JP | 5-40675 | 2/1993 |
| JP | 11-296419 | 10/1999 |

OTHER PUBLICATIONS

Linux: Should You Use Twice the Amount of Ram as Swap Space by Gite; Published Nov. 19, 2008; Available at http://www.cyberciti.biz/tips/linux-swap-space.html.*

(Continued)

*Primary Examiner* — Reginald Bragdon
*Assistant Examiner* — Paul Knight
(74) *Attorney, Agent, or Firm* — Staas & Halsey LLP

(57) ABSTRACT

An information processing apparatus includes a processor, a first memory, and a second memory, wherein the second memory includes a first data storage region having a first data capacity and a second data storage region having a second data capacity smaller than the first data capacity, and the processor is configured to, in a case of executing first processing, select the first data storage region as a storage (Continued)

region for data to be written into the second memory by the first processing, and select the second data storage region as a storage region for data to be written into the second memory by second processing, and in a case of not executing the first processing, select the first data storage region as a storage region for data to be written from the first memory to the second memory by the second processing.

13 Claims, 18 Drawing Sheets

(56) References Cited

U.S. PATENT DOCUMENTS

| | | | | |
|---|---|---|---|---|
| 6,128,734 | A * | 10/2000 | Gross | G06F 9/4408 |
| | | | | 713/1 |
| 6,615,364 | B1 * | 9/2003 | Nagasuka | G06F 11/073 |
| | | | | 714/24 |
| 7,437,524 | B2 * | 10/2008 | Narayan | G06F 11/073 |
| | | | | 711/161 |
| 2002/0029359 | A1 * | 3/2002 | Kiyoi | G06F 11/073 |
| | | | | 714/45 |
| 2003/0172145 | A1 * | 9/2003 | Nguyen | G06Q 10/10 |
| | | | | 709/223 |
| 2003/0188227 | A1 * | 10/2003 | Maison | G06F 11/0763 |
| | | | | 714/42 |
| 2004/0091114 | A1 * | 5/2004 | Carter | G06F 21/606 |
| | | | | 380/259 |
| 2005/0240806 | A1 * | 10/2005 | Bruckert | G06F 9/52 |
| | | | | 714/6.11 |
| 2008/0195836 | A1 * | 8/2008 | Muppirala | G06F 11/1441 |
| | | | | 711/173 |
| 2008/0209264 | A1 * | 8/2008 | Morse | G06F 11/0706 |
| | | | | 714/6.32 |
| 2009/0083478 | A1 * | 3/2009 | Kunimatsu | G06F 12/0246 |
| | | | | 711/103 |
| 2009/0216967 | A1 * | 8/2009 | Sugawara | G06F 11/0706 |
| | | | | 711/156 |
| 2013/0111264 | A1 * | 5/2013 | Settsu | G06F 11/0778 |
| | | | | 714/11 |

OTHER PUBLICATIONS

Understanding Crash Dump Files by Hameed; Published Jan. 2008; Available at: http://blogs.technet.com/b/askperf/archive/2008/01/08/understanding-crash-dump-files.aspx.*

Kernel Debugging; by Richards; As published Jul. 4, 2014 at https://www.freebsd.org/doc/en/books/developers-handbook/kerneldebug.html.*

Configuring dump space for systems with large physical memory; Unixware; as published May 2009 at http://uw714doc.sco.com/en/SM_perform/_Configuring_dump_large_memory.html.*

* cited by examiner

INFORMATION PROCESSING IN RESPONSE TO FAILURE OF APPARATUS, METHOD, AND STORAGE MEDIUM

CROSS-REFERENCE TO RELATED APPLICATION

This application is based upon and claims the benefit of priority of the prior Japanese Patent Application No. 2013-251848 filed on Dec. 5, 2013, the entire contents of which are incorporated herein by reference.

FIELD

The embodiments discussed herein are related to an information processing apparatus, an information processing method, and a storage medium.

BACKGROUND

A computer system generally includes a central processing unit (CPU), a volatile main storage device such as a random access memory (RAM), and a nonvolatile auxiliary storage device. An example of known auxiliary storage devices is a hard disk drive (HDD). In the computer system, swap information and dump information are stored in an auxiliary storage device such as a hard disk drive. Specifically, in the computer system, among programs and processes loaded on the main storage device, currently-unused programs and processes are temporarily migrated to the auxiliary storage device. A region in the main storage device which has been occupied by the currently-unused programs and processes migrated to the auxiliary storage device is released as a storage region usable in the computer system. Also, in the computer system, all the data in the main storage device are stored in the auxiliary storage device as dump information in order to use the data, for example, for analyzing a failure when the failure occurs in the computer system.

For computer systems, various kinds of techniques are proposed to efficiently perform processing using the swap information and the dump information. For example, there is a technique that increases speed of processing of information relating to dump information that is temporarily saved in a saving area in order to load the dump information into an auxiliary storage device at a rebooting operation. In this technique for increasing the speed of the processing of the information relating to the dump information, coupling between a group of RAMs serving as transfer sources and a group of RAMs serving as transfer destinations is switched when the dump information is temporarily saved in order to load the dump information into an auxiliary storage device, so that the time desired for saving the dump information is reduced. In addition, there is another technique that reduces a time of processing that copies information between auxiliary storage devices such as HDDs. In this technique for reducing the time of the processing for copying the information between the auxiliary storage devices, only a region is copied which is to be used for an operation of the computer system based on a use state and a purpose registered in advance for each region in the auxiliary storage device, so that the copying time is reduced. Related art documents include Japanese Laid-open Patent Publications No. 5-40675 and No. 11-296419.

SUMMARY

According to an aspect of the invention, an information processing apparatus includes a processor configured to perform data processing, a first memory coupled to the processor and configured to store processing data obtained by the data processing performed by the processor, and a second memory coupled to the processor, wherein the second memory includes a first data storage region having a first data capacity and a second data storage region having a second data capacity smaller than the first data capacity, and the processor is configured to, in a case of executing first processing, select the first data storage region as a storage region for data to be written from the first memory to the second memory by the first processing, and select the second data storage region as a storage region for data to be written from the first memory to the second memory by second processing, and in a case of not executing the first processing, select the first data storage region as a storage region for data to be written from the first memory to the second memory by the second processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Along with a recent increase in a storage capacity of a main storage device mounted on a computer system, information amounts of swap information and dump information have also been increasing. Accordingly, a large-capacity storage region is prepared in an auxiliary storage device in advance and the swap information and the dump information are stored therein.

In a case where swap information and dump information whose information amounts are increasing are stored in an auxiliary storage device, the technique that increases speed of processing of information relating to dump information uses an auxiliary storage device, in which large-capacity storage regions are prepared in advance for the swap information and the dump information, to store the swap information and the dump information. Also, the technique for copying a region alone based on the use state and the like between the auxiliary storage devices uses an auxiliary storage device, in which large-capacity storage regions are prepared in advance for the swap information and the dump information, to store the swap information and the dump information.

In this regard, the dump information is stored in the auxiliary storage device during dump processing such as emergency processing performed when a failure occurs in a computer system. Accordingly, when the computer system operates normally, the storage region defined in the auxiliary storage device to store the dump information is reserved as a redundant storage region.

First Embodiment

Figure 1:
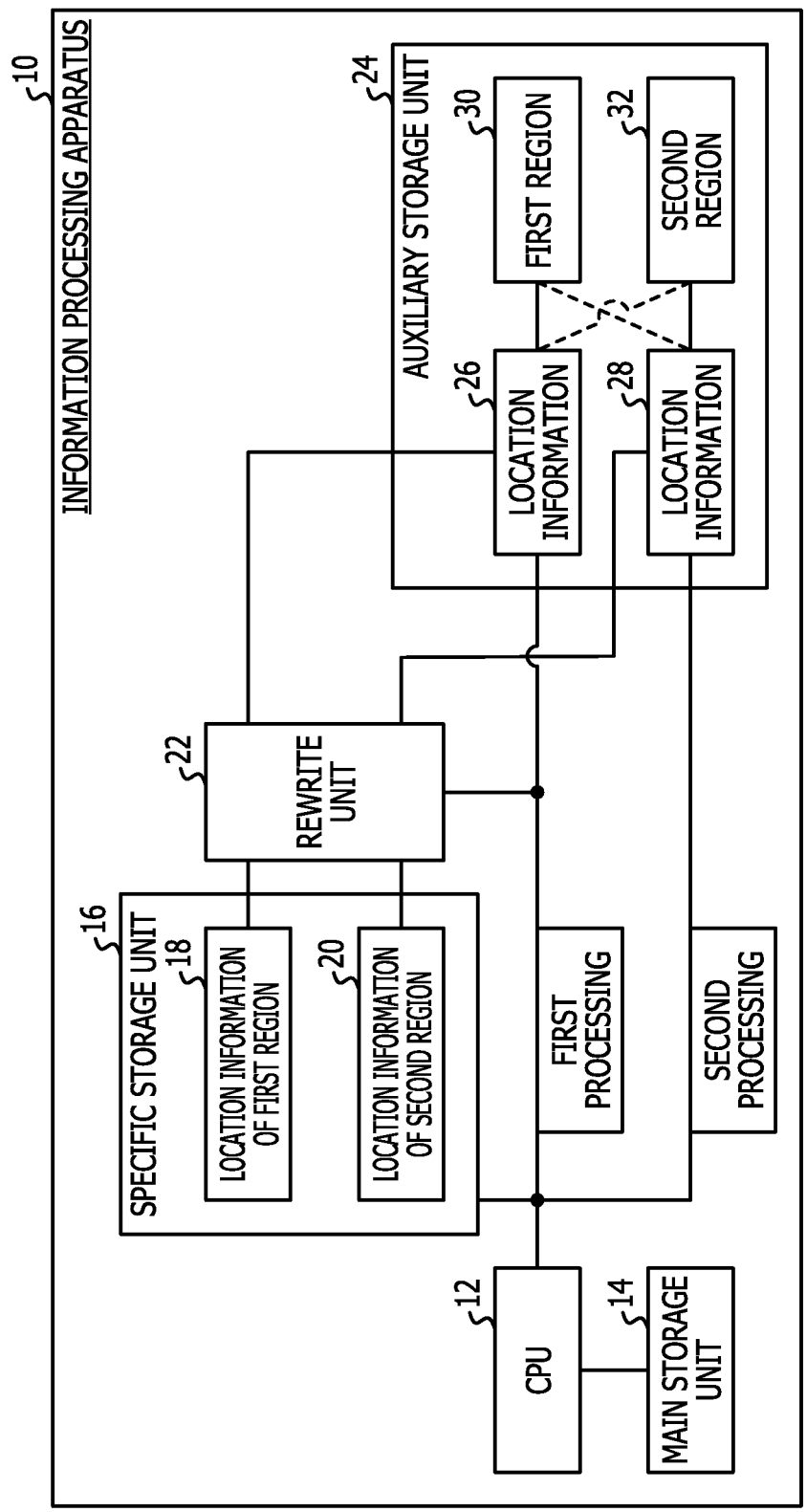
FIG. 1 is a block diagram illustrating a configuration example of an information processing apparatus according to a first embodiment.

FIG. 1 illustrates an information processing apparatus 10 according to the present embodiment. The information processing apparatus 10 includes a CPU 12, a main storage unit 14, a specific storage unit 16, a rewrite unit 22, and an auxiliary storage unit 24. The CPU 12 is coupled to the main storage unit 14, the specific storage unit 16, the rewrite unit 22, and the auxiliary storage unit 24. The auxiliary storage unit 24 includes a first region 30 with a capacity smaller than a storage capacity of the main storage unit 14 and a second region 32 with a capacity equal to or larger than the storage capacity of the main storage unit 14. The auxiliary storage unit 24 stores location information 26 and 28 indicating locations of regions included in the auxiliary storage unit 24. The specific storage unit 16 stores location information 18 indicating a location of a first region and location information 20 indicating a location of a second region.

It is noted that the information processing apparatus 10 is an example of an information processing apparatus in the disclosed technique and the main storage unit 14, the specific storage unit 16, the rewrite unit 22, and the auxiliary storage unit 24 are examples of a main storage unit, a specific storage unit, a rewrite unit, and an auxiliary storage unit, respectively, in the disclosed technique.

When a first region 30 is allocated in the auxiliary storage device 24 as a region to store information to be used in first processing, in the information processing apparatus 10, information indicating a location of the first region 30 is stored as location information 26 and the location information 26 is copied to location information 18 stored in the specific storage unit 16. Similarly, when a second region 32 is allocated in the auxiliary storage unit 24 as a region to store information to be used in second processing, in the information processing apparatus 10, information indicating a location of the second region 32 is stored as location information 28 and the location information 28 is copied to the location information 20 stored in the specific storage unit 16. One example of the first processing includes dump processing which is performed when a failure occurs in the information processing apparatus 10. Also, one example of the information used in the first processing includes dump information. Similarly, one example of the second processing includes swap processing which is performed when the information processing apparatus 10 operates normally. Also, one example of the information used in the second processing includes swap information.

When the information processing apparatus 10 operates normally, the second processing is performed and the CPU 12 stores at least one piece of the information stored in the main storage unit 14 in the second region 32 based on the location information 28 stored in the auxiliary storage unit 24. Accordingly, the information processing apparatus 10 can perform the processing at the time of normal operation. On the other hand, when a failure occurs in the information processing apparatus 10, based on an instruction from the CPU 12, the rewrite unit 22 rewrites the location information 28 stored in the auxiliary storage unit 24 by the location information 18 stored in the specific storage unit 16 as the location information of the first region. Also, the rewrite unit 22 rewrites the location information 26 stored in the auxiliary storage unit 24 based on the location information 20 stored in the specific storage unit 16 as the location information of the second region. Accordingly, when the first processing such as the dump processing is performed in the information processing apparatus 10, the CPU 12 stores the information stored in the main storage unit 14 in the second region 32 based on the rewritten location information 26 of the auxiliary storage unit 24. Consequently, when the first processing is performed, the region storing the information to be used in the first processing is switched from the first region 30 to the second region 32. Thus, the capacity of the first region of the auxiliary storage unit 24, which is defined before the first processing is performed, can be reduced to a capacity smaller than the storage capacity of the main storage unit 14.

Figure 2:
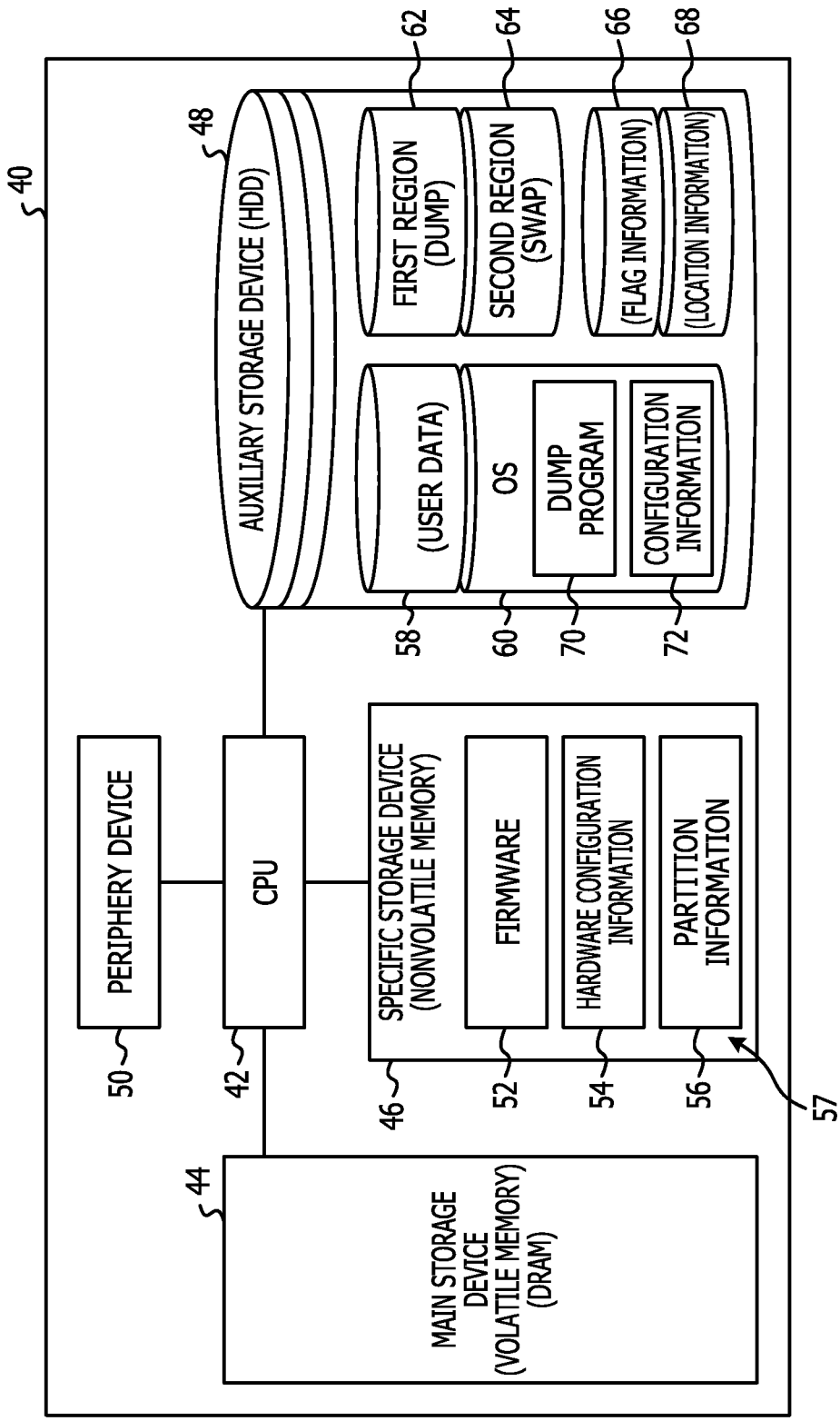
FIG. 2 is a block diagram illustrating a configuration example of a computer system.
Figure 3:
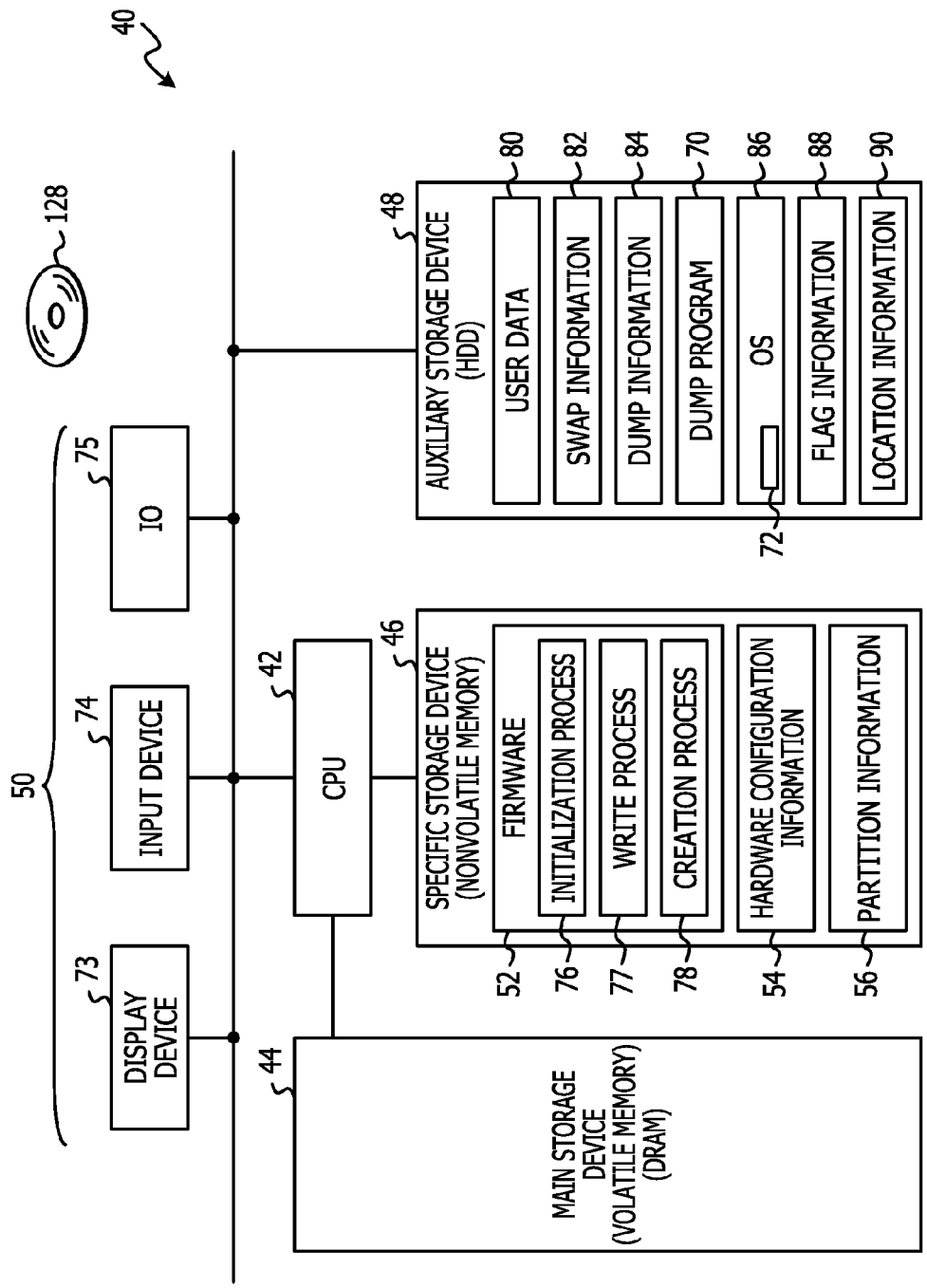
FIG. 3 is a block diagram illustrating a detailed configuration example of the computer system.

The information processing apparatus 10 can be achieved by the computer system. FIG. 2 illustrates a computer system 40 as an example of the computer system. FIG. 3 illustrates a detailed configuration example of the computer system 40. The computer system 40 includes a CPU 42. The CPU 42 is coupled to a dynamic random access memory (DRAM) 44 as a main storage device, a nonvolatile memory 46 as a specific storage device, an HDD 48, and a periphery device 50. As examples of the periphery device 50, a display device 73, an input device 74 such as a keyboard or a mouse, an input and output (I/O) device 75 for performing reading and writing on an inserted recording medium 128 are coupled to the CPU 42. The DRAM 44 is used as a main storage device and achieves a high-speed access to the information to be used by the CPU 42. It is noted that stored contents in the DRAM 44 are erased by power shutdown.

In the HDD 48, a region 58 storing user data 80, a region 60 storing an operating system (OS) 86, a first region 62, and a second region 64 are allocated. The first region 62 is a region which is set as a dump region storing dump information 84 during the system building and the second region 64 is also a region which is set as a swap region storing swap information 82 during the system building. Also, the HDD 48 includes a flag storage region 66 which is a region storing flag information 88 and a region 68 which is a sector called as a master boot record (MBR) including location information 90 indicating each location of respective regions.

It is noted that in the following description, the region for storing the dump information 84 is referred to as a dump region and the region for storing the swap information 82 is referred to as a swap region.

The nonvolatile memory 46 stores firmware 52, hardware configuration information 54, and partition information 56. The nonvolatile memory 46 uses a flash memory or the like, which is a semiconductor memory, and can retain the stored information even after power is shut down. The firmware 52 is a program for controlling hardware resources, which causes functions of the hardware resources included in the computer system to be maximized. Also, for example, the hardware configuration information 54 indicates configuration information of the hardware resources of the HDD 48, the input device 74 such as a keyboard, and the display device 73 such as a display, which are included in the computer system. The partition information 56 is stored in the storage region 57 provided in the nonvolatile memory 46.

In the present embodiment, the firmware 52 stored in the nonvolatile memory 46 stores a process as one example of processing programs which are executed when the computer system 40 is operated. Specifically, the firmware 52 includes an initialization process 76, a rewrite process 77, and a creation process 78. It is noted that the processing program to be executed when the computer system 40 is operated may be stored in the HDD 48 or the recording medium 128, and be read and be executed. The initialization process 76 is one example of a processing program relating to the system building processing for the computer system 40. The rewrite process 77 is one example of a processing program relating to processing of acquiring dump information 84 during the dump processing such as emergency processing in which a failure occurs in the computer system 40. The creation process 78 is one example of a processing program relating to maintenance processing such as exchange of the HDD 48 with a new HDD in the computer system 40.

In the HDD 48, a region 60 in which an OS is installed for activating a system and a region 58 storing user data used on the OS are allocated. Also, in the HDD 48, a second region 64 is allocated as a region storing swap information for supporting a memory space larger than the capacity of the DRAM 44 during the OS operation. In addition, in the HDD 48, a first region 62 is allocated as dump information. It is noted that the region 60 in which the OS is installed stores a dump program 118 which causes the processing to be executed to store the contents of the DRAM 44 in the HDD 48 as the dump information. Since the dump information is stored in the HDD 48, the contents are retained even after the power of the computer system 40 is shut down. Accordingly, the contents of the DRAM 44 when a failure occurs in the computer system 40 can be investigated.

Also, the region 60 in which the OS is installed stores information indicating a first region 62 and a second region 64 which are allocated on the HDD 48 as configuration information 72 of the OS. In other words, the OS configuration information 72 stores information indicating the second region 64 as a swap region and the first region 62 as the dump region. For example, when a region name sdb is added to the second region 64 for swap and a region name sdd is added to the first region 62 for dump, the OS associates the names of regions with the regions, or partitions, of the HDD 48. Accordingly, when the swap information 82 is stored in the HDD 48, the computer system 40 can make an access to the second region 64 by designating the name of region sdb based on the OS configuration information 72. Similarly, when the dump information 84 is stored in the HDD 48, the computer system 40 can make an access to the first region 62 by designating the name of region sdd based on the OS configuration information.

A head sector of the HDD 48 is referred to as an MBR and stores various pieces of information including location information indicating the locations of the regions allocated in the HDD 48.

Figure 4:
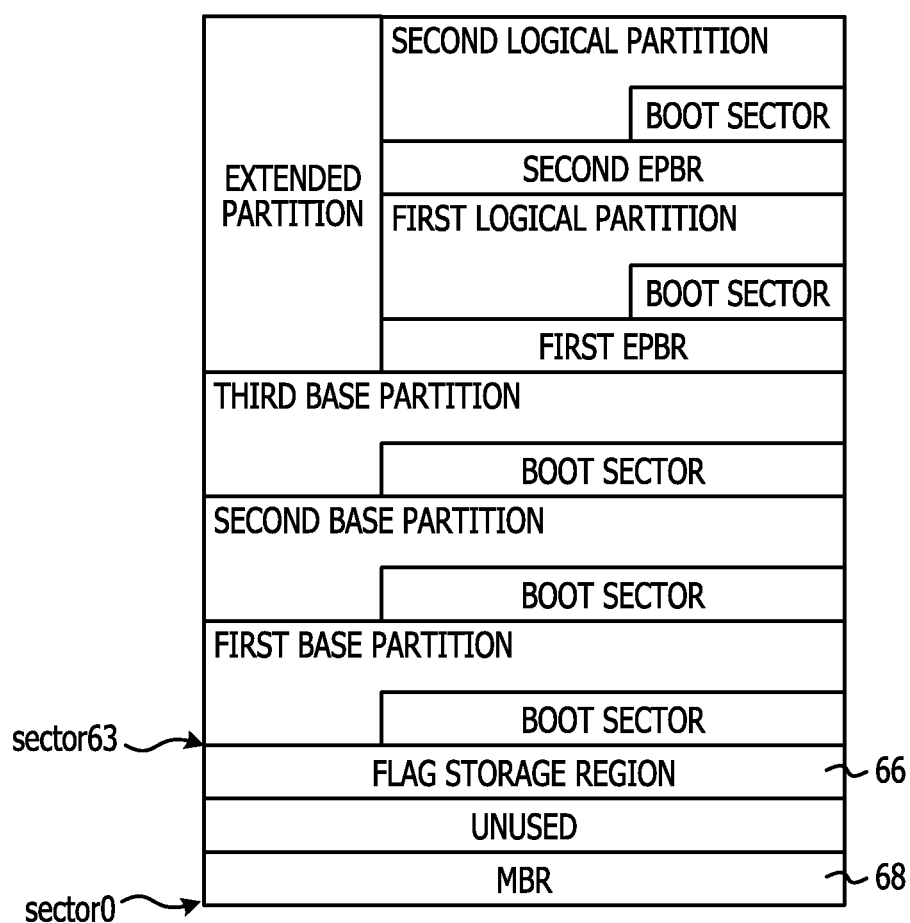
FIG. 4 is a view illustrating an example data structure of an HDD.
Figure 5:
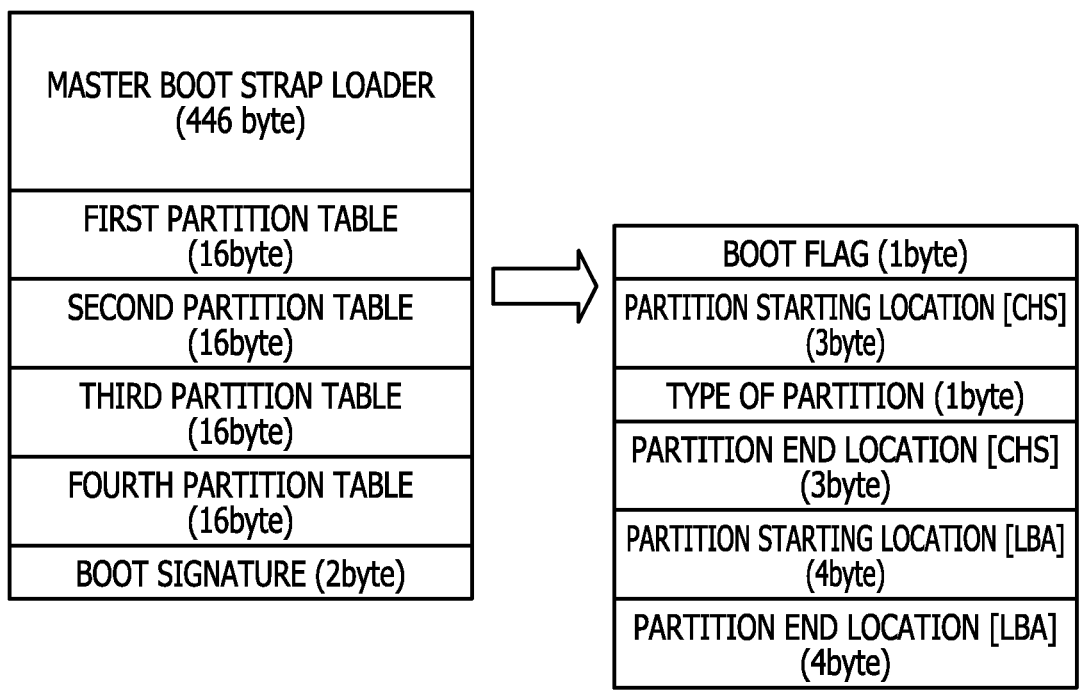
FIG. 5 is a view illustrating an example data structure of a master boot record (MBR)

FIG. 4 illustrates an example data structure of the HDD 48. In general, the HDD 48 is managed by a region which is called as a sector in units of 512 bytes. FIG. 5 illustrates a general example of a data structure of the head sector (sector 0), or so-called an MBR, of the HDD 48.

Four regions (partitions) can be allocated at maximum in the HDD 48. The MBR of the HDD 48 includes a partition table in which locations, sizes, and the like of the allocated regions are defined. The partition table corresponds to the location information 90 indicating the locations of the regions allocated in the HDD 48. Also, the MBR of the HDD 48 includes a boot signature indicating a validity of the MBR and a master boot strap loader storing a program executing processing on the partition to be firstly activated.

The partition table of the MBR stores various pieces of information including a partition starting location, a partition type, and a partition ending location. As the both pieces of the information indicating the partition starting location and the partition ending location, information of a cylinder-head-sector (CHS) and a logical block addressing (LBA) is stored for maintaining compatibility. It is noted that, as the capacity of the HDD 48 increases, it is general that a dummy value is set on a [CHS] side and only a value on an [LBA] side is used to define the capacity.

Figure 6:
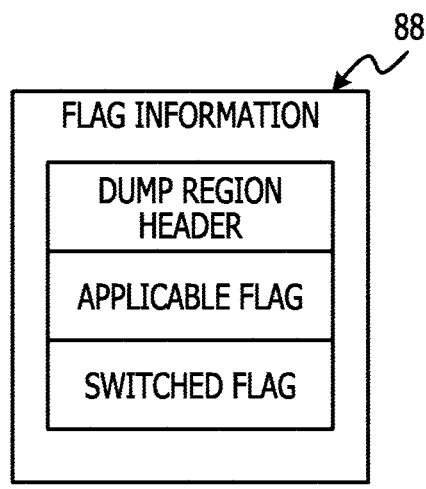
FIG. 6 is a view illustrating an example data structure of flag information stored in the HDD.

FIG. 6 illustrates an example data structure of the flag information stored in the HDD 48. In the HDD 48 according to the present embodiment, a flag storage region 66 is newly provided in an unused region. The flag storage region 66 stores flag information 88. The flag information 88 includes information indicating each of a dump region header, an applicable flag, and a switched flag. The dump region header is information specific to the HDD 48 for identifying the flag information 88. The applicable flag is information indicating if rewrite processing of the location information can be executed on the HDD 48. The switched flag is information indicating if the location information of the second region 64 is switched with the location information of the first region 62 in the MBR of the HDD 48.

Figure 7:
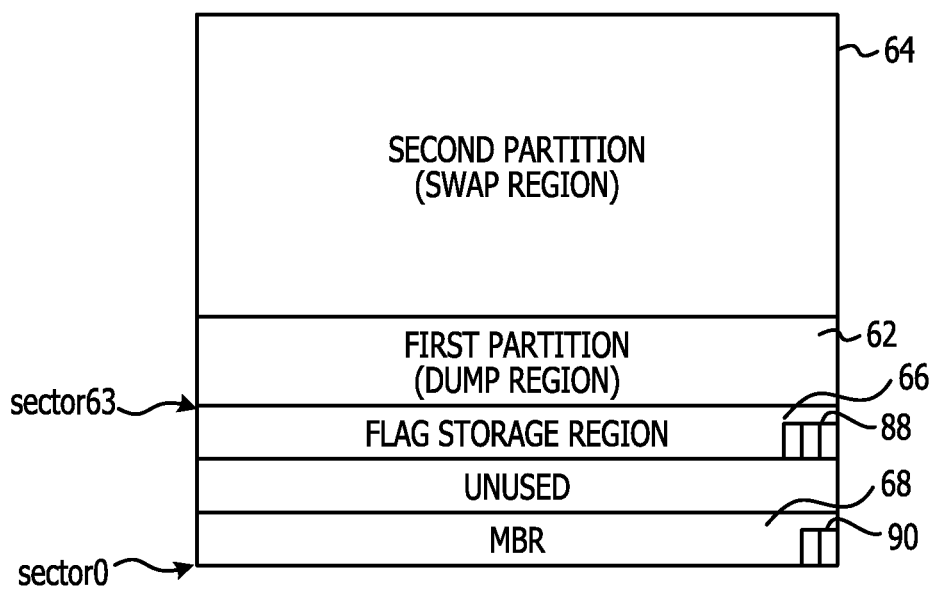
FIG. 7 is a view illustrating an example data structure of the HDD.

FIG. 7 illustrates an example data structure of the HDD 48 to which the partitions are allocated, which includes the flag storage region 66 storing the flag information 88 and the region 68 indicating the MBR. FIG. 7 illustrates a portion of the data structure of the HDD 48, which includes the flag storage region 66 storing the flag information 88 and the region 68 storing the MBR including the location information 90 and to which the first region 62 and the second region 64 are allocated. It is noted that in FIG. 7, the first region 62 allocated as the dump region is expressed by a first partition and the second region 64 allocated as the swap region is expressed by a second partition.

Figure 8:
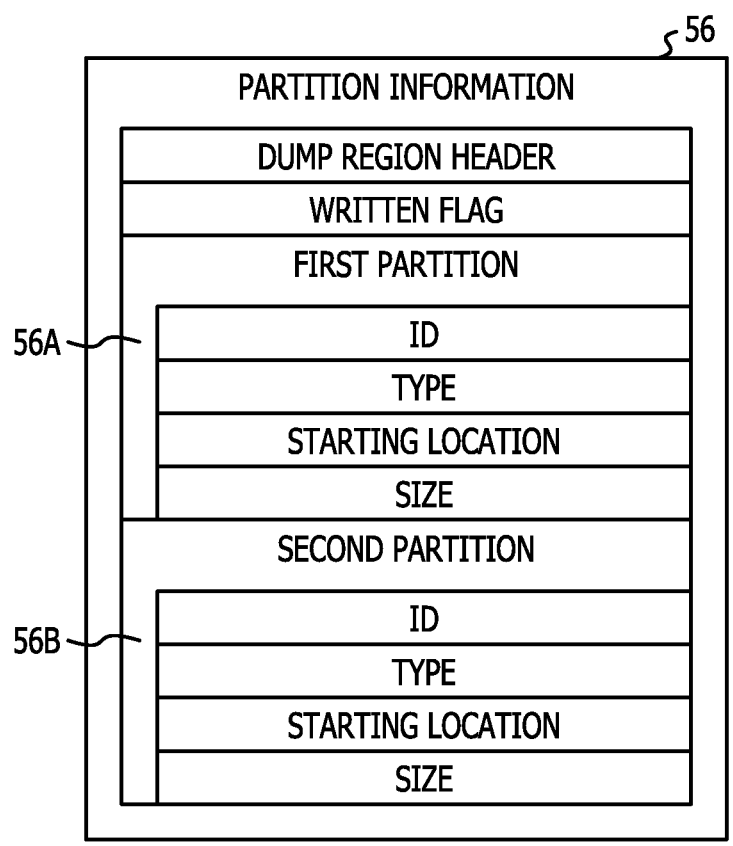
FIG. 8 is a view illustrating an example data structure of partition information.

FIG. 8 illustrates an example data structure of the partition information 56 stored in the storage region 57 in the nonvolatile memory 46. The partition information 56 includes various pieces of information indicating each of a dump region header, a rewritten flag, information indicating the first partition which is the first region 62, and information indicating the second partition which is the second region 64. The dump region header is specific information same as the information indicating the dump region header, which is included in the flag information 88. The rewritten flag is information indicating if rewrite processing (to be described later in detail) has been already executed on the location information. The information indicating the first partition and the information indicating the second partition are information for specifying each of the first partition and the second partition. In the present embodiment, to specify each of the first partition and the second partition, the information includes information indicating each of an ID, a type, starting location, and a size. The ID is a specific value indicating a partition, and the type is information indicating a type of the partition. The starting location is information indicating a starting location of the partition and the size is information indicating a size such as the number of sectors from the starting location of the partition to the ending location of the partition.

In the present embodiment, the case where the computer system 40 includes one CPU 42 is described. However, the number of CPUs is not limited to one but may be two or larger.

The CPU 42 corresponds to the CPU 12 in FIG. 1 and the DRAM 44 which is a main storage device corresponding to the main storage unit 14 in FIG. 1. The nonvolatile memory 46 corresponds to the specific storage unit 16 in FIG. 1 and the HDD 48 corresponds to the auxiliary storage unit 24 in FIG. 1. In addition, the CPU 42 operates, as the rewrite unit 22 in FIG. 1, by executing the rewrite process 77. In other words, the information processing apparatus 10 is achieved by the computer system 40 and the computer system 40 operates as the rewrite unit 22 (see FIG. 1) by executing the rewrite process 77.

Also, the process included in the firmware 52 which is stored in the nonvolatile memory 46 is an example information processing program in the disclosed technique. For example, the rewrite process 77 is an example information processing program for causing the computer system 40 to function as the information processing apparatus 10.

An operation of the present embodiment is described below.

The DRAM 44 in the computer system 40 may be a large-volume memory. As the memory capacity of the DRAM 44 increases, a larger capacity region has to be reserved for a swap region and a dump region. For example, in a server on which multiple physical CPUs are mounted and a physical memory with a large capacity of a several terabytes (TB) can be mounted, each capacity of a swap region and a dump region which being reserved in advance becomes several terabytes. However, the dump region is a region which is not used in a case other than the dump processing which is performed when a failure occurs. This means that the dump region in a normal operation is a redundant region. For this reason, in the present embodiment, a dump region to be allocated to the HDD 48 when the computer system 40 is operating is removed.

Figure 9:
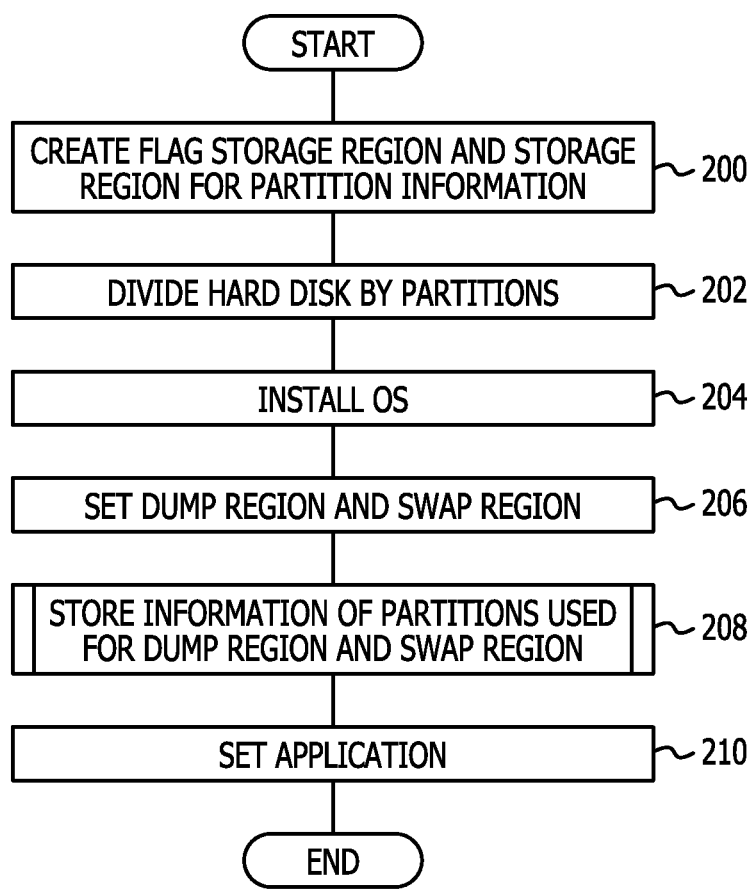
FIG. 9 is a flowchart illustrating a processing flow of system building processing for the computer system.

FIG. 9 illustrates an example flow of the system building processing for the computer system 40. It is noted that in the present embodiment, a first partition, which is the first region 62 in the HDD 48 is defined as a dump region during the system building processing. In addition, a second partition which is the second region 64 in the HDD 48 is defined as a swap region.

In the present embodiment, the CPU 42 executes the initialization process 76 stored in the nonvolatile memory 46, so that the system building processing routine in FIG. 9 is executed. At step 200, the CPU 42 creates a flag storage region 66 to store the flag information 88 in an unused portion in the HDD 48 which is an auxiliary storage device and creates a storage region 57 to store the partition information 56 in the nonvolatile memory 46. It is assumed that initial values of components of the flag information 88 (see FIG. 6) and the partition information 56 (see FIG. 8) are defined in advance.

After that, the CPU 42 allocates multiple regions (partitions) to the HDD 48 according to usage. In other words, at step 202 the CPU 42 performs partitioning on the HDD 48 based on an instruction which is manually inputted by an administrator. In short, based on information indicating, for example, a region in which an OS is installed, a dump region, and a swap region, multiple partitions are set in the HDD 48. The CPU 42 divides the HDD 48 into partitions according to the setting information indicating the settings of the partitions. Accordingly, for example, the HDD 48 is divided into the partitions which are set as a region in which the OS is installed, a dump region, and a swap region.

In the present embodiment, during the system building, a region for storing a dump information 84 (the partition as the dump region) does not have to be larger than a region for storing the information to be stored in the DRAM 44. This is because the dump region is changed when the dump information is stored in the present embodiment. Accordingly, the administrator may set a small capacity as instruction information relating to a region in which the dump information 84 is supposed to be stored. For example, the capacity may be small such that a region (partition) alone exists on the HDD 48. During the partitioning of the HDD 48, the partition table (location information 90) is stored in the MBR of the HDD 48 which is divided into the multiple partitions (see, FIGS. 4 and 5).

After the partitioning of the HDD 48 at step 204, the CPU 42 installs the OS 86 in a partition which is set as a region in which the OS 86 is installed. For example, the CPU 42 reads information from the recording medium 128 in which the OS 86 mounted in the IO device 75 is stored and installs the OS in the HDD 48. It is noted that during the installation of the OS 86, the dump program 70 is also stored in the HDD 48. At step 206, the CPU 42 sets each of the dump region and the swap region according to the setting information. It is assumed in the present embodiment that a first partition in the HDD 48, which is the first region 62, is set as a dump region. It is also assumed that a second partition in the HDD 48, which is the second region 64, is set as a swap region. It is noted that respective names of the dump region and the swap region are set and given by the OS 86. The information indicating a correspondence between the names of the dump region and the swap region and the partitions in the HDD 48 is stored as the configuration information 72. The names of the regions may use information inputted by the administrator.

At step 208, the CPU 42 stores various pieces of information in the flag storage region 66 created at step 200 and the storage region 57 storing the partition information 56. At step 210, the CPU 42 stores the information indicating the setting of various kinds of applications in the HDD 48 as user data 80. In other words, at step 210, the information indicating the setting for using the installed various kinds of applications after the OS is installed is stored in the HDD 48 as user data.

Figure 10:
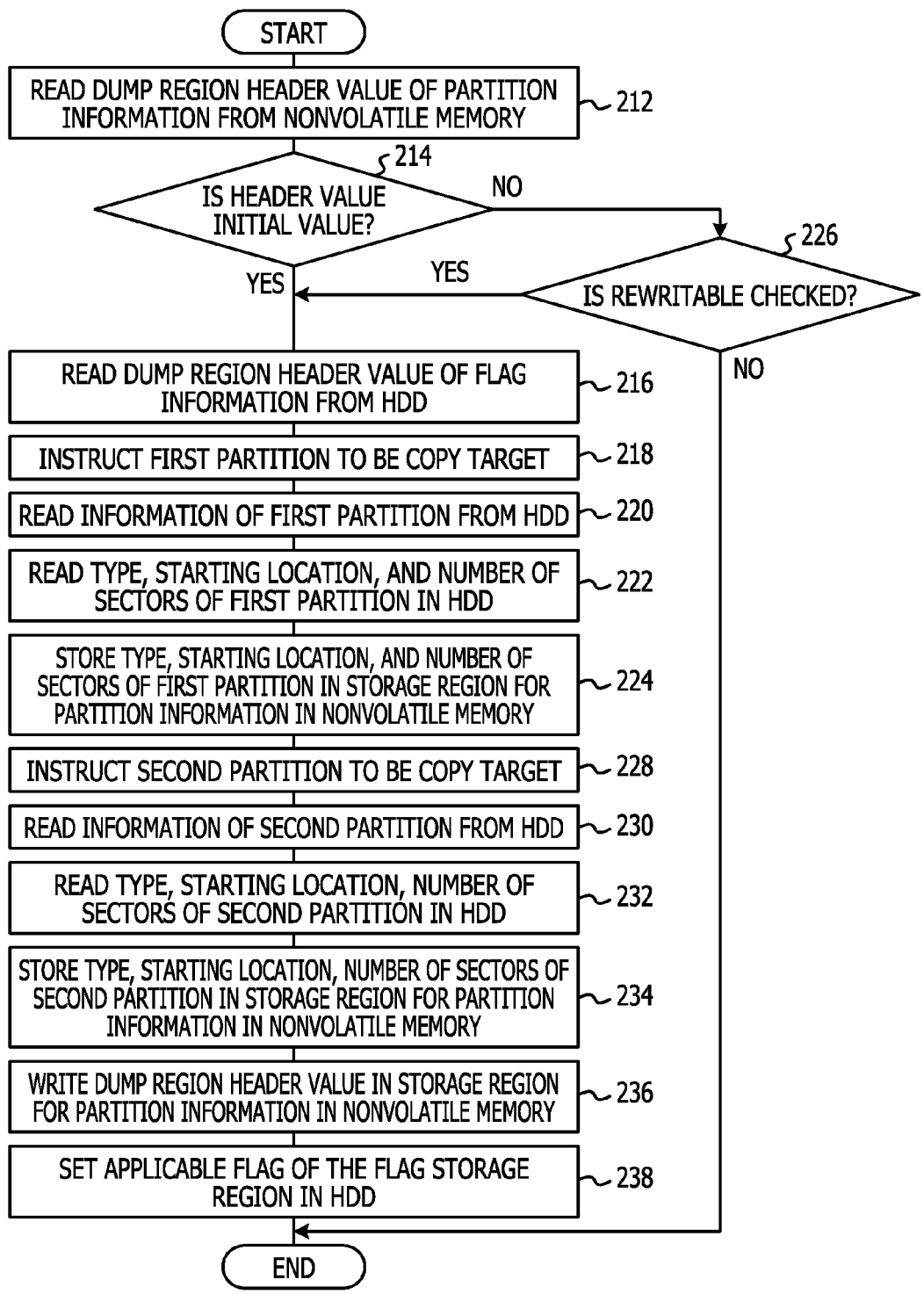
FIG. 10 is a flowchart illustrating a processing flow of copying the partition information in a nonvolatile memory.

FIG. 10 illustrates a processing flow of copying the partition information of the HDD 48 during the system building to the nonvolatile memory 46. At step 208 in FIG. 9, the processing routine illustrated in FIG. 10 is executed. At step 212, the CPU 42 reads a dump region header of the partition information 56 stored in the storage region 57 in the nonvolatile memory 46 and, at the next step 214, determines if the read header is same as the initial value defined in advance. When Yes is determined at step 214, the CPU 42 proceeds the processing to step 216. When No is determined, the CPU 42 proceeds the processing to step 226.

At step 216, the CPU 42 reads the dump region header of the flag information 88 stored in the flag storage region 66 in the HDD 48. Then, the CPU 42 stores information of the first region 62 defined for the dump region in a first partition portion 56A (see FIG. 8) of the partition information 56 in the storage region 57. Specifically, at step 218, the CPU 42 instructs the first partition. At step 218, the CPU 42 instructs the first partition to be copied to the nonvolatile memory 46, of the partitions defined in the HDD 48 during the system building. In other words, at step 218, based on the information set at step 206 in FIG. 9, the partition set for the dump region is instructed as the first partition. It is noted that the first partition may be instructed by specifying, after the initial value inputted by the administrator is read at step 218, a partition corresponding the inputted value.

At the next step 220, the CPU 42 reads the first partition information, which is the partition table of the first region 62 for the dump region, from the HDD 48. At step 222, the CPU 42 reads a type, a starting location, and the number of sectors from the information included in the partition table. Furthermore, at step 224, the CPU 42 stores the type, the starting location, and the number of sectors, as information indicating the type, starting location and size of the first partition, in the first partition portion 56A in the storage region 57 in the nonvolatile memory 46.

After that, the CPU 42 stores the information of the second region 64 defined as the region for the swap region in a second partition portion 56B (see FIG. 8) of the partition information 56 in the storage region 57. Specifically, at step 228, the CPU 42 instructs the partition set for the swap region as a second partition. At the next step 230, the CPU 42 reads the partition table of the second region 64 for the swap region from the HDD 48, and, at next step 232, reads the type, the starting location, and the number of sectors. Next, at step 234, the CPU 42 stores the type, the starting location, and the number of sectors, as the information indicating the type, starting location, and number of sectors of the second partition, in the second partition portion 56B in the storage region 57 in the nonvolatile memory 46.

After the information relating to the partitions of the dump region and the swap region are stored in the storage region 57, at step 236, the CPU 42 writes the value of the dump region header which is read at step 216 and is a specific value for the HDD 48, in the storage region 57 in the nonvolatile memory 46. In other words, the value of the dump region which is a specific value of the HDD 48 is written in the dump region header in the storage region 57 in the nonvolatile memory 46. Accordingly, the partition information 56 and the flag information 88 are associated with each other by the information indicated in the dump region header. At step 238, the CPU 42 sets an applicable flag of the flag storage region 66 in the HDD 48, so as to record that the partition information 56 is copied in the storage region 57 in the nonvolatile memory 46. What the applicable flag is set means that rewrite processing for the partition table is applicable. Accordingly, with the applicable flag included in the flag storage region 66 provided on the HDD 48, firmware can detect that it is a device which is already made compatible to the rewrite processing for the partition table according to the present embodiment.

On the other hand, when No is determined at step 214, there is a possibility such that the value of the dump region header of the partition information 56 is changed from the initial value. Therefore, at step 226, the CPU 42 determines if processing of copying the information to the nonvolatile memory 46 is executable. When Yes is determined at step 226, the CPU 42 proceeds the processing to step 216, while when No is determined, the present processing is terminated. The determination made at step 226 can be executed by determining and confirming that the partition information 56 stored in the storage region 57 in the nonvolatile memory 46 is overwritten. In this case, at step 226, the CPU 42 can make determination based on the instruction information made by the manual input of an administrator.

Hereinafter, described is information acquisition processing of acquiring dump information when dump processing such as emergency processing is performed for the computer system 40.

Figure 11:
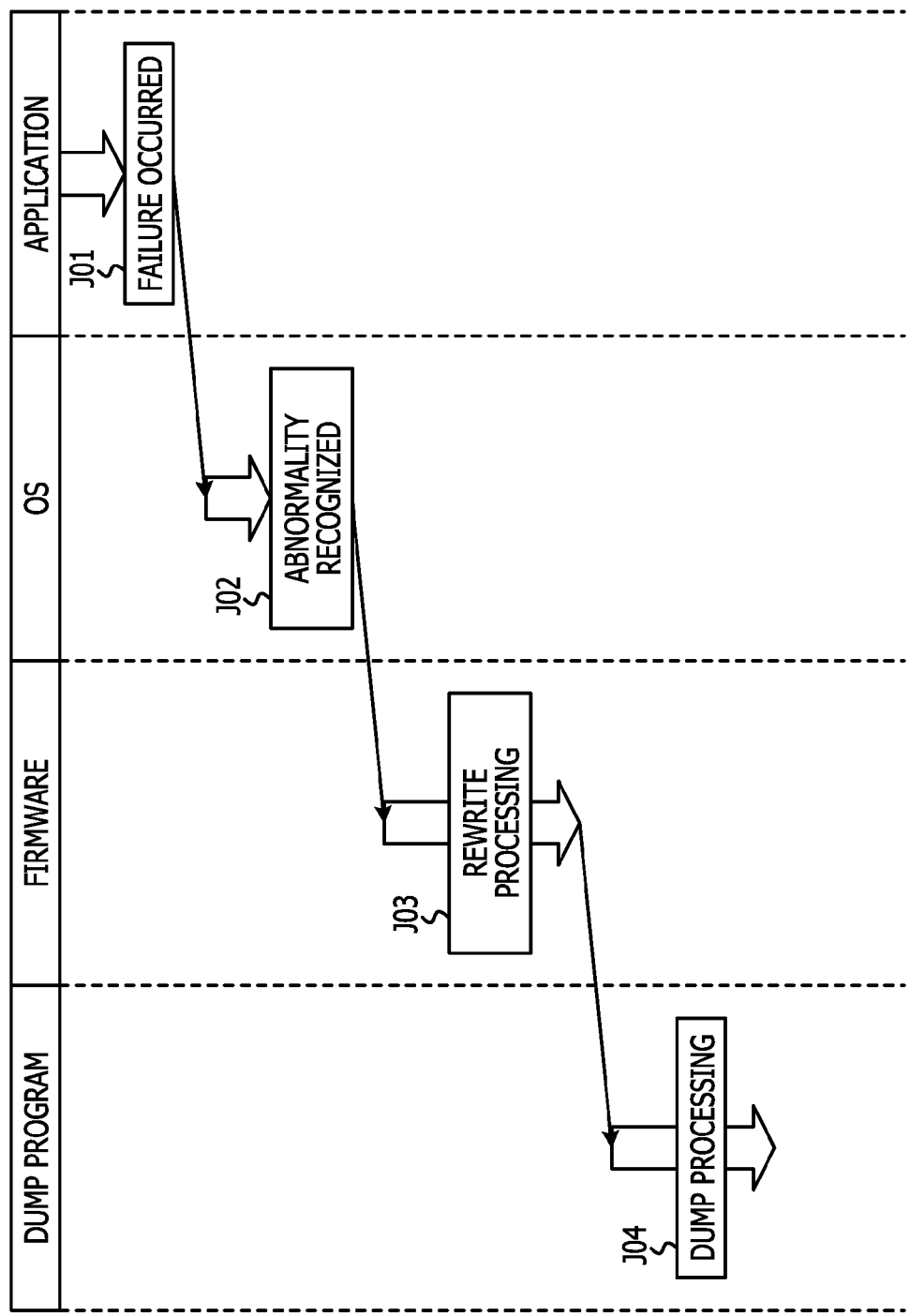
FIG. 11 is a sequential flow illustrating an example processing flow related to a failure occurrence in the computer system.

FIG. 11 illustrates an example flow of processing which is performed when a failure occurs in the computer system 40 according to the present embodiment. FIG. 11 illustrates transition of states in the computer system 40 from a state where a failure occurs in an application executed in the computer system 40 till a state where the dump information is acquired.

After the system building processing on the computer system 40 is finished, the computer system 40 is operated to execute an application. When a failure occurs during executing the application in the computer system 40 (state J01), the control is taken over from the CPU 42 to the OS 86. The OS 86 detects that a failure occurs in the application and executes handling processing for the occurred failure by stopping the operation of the application, or the like. Also, when the OS 86 has difficulty in continuing the processing due to the occurrence of application failure, the OS 86 detects an abnormal state (state 302) and hands over the control to the firmware 52. The firmware 52 executes rewrite processing as pre-processing for storing the dump information 84 in the HDD 48 (state J03). The rewrite processing is to switch a storing destination from the dump region defined in the current HDD 48 to a region in which the dump information 48 can be filled. In other words, in the rewrite processing, the dump region is switched from the currently-set first region 62 for the dump region to the second region 64 for the swap region. When the rewrite processing is terminated, the firmware 52 performs the dump processing by executing a dump program (state J04) and stores the dump information 84 in the HDD 48.

Figure 12:
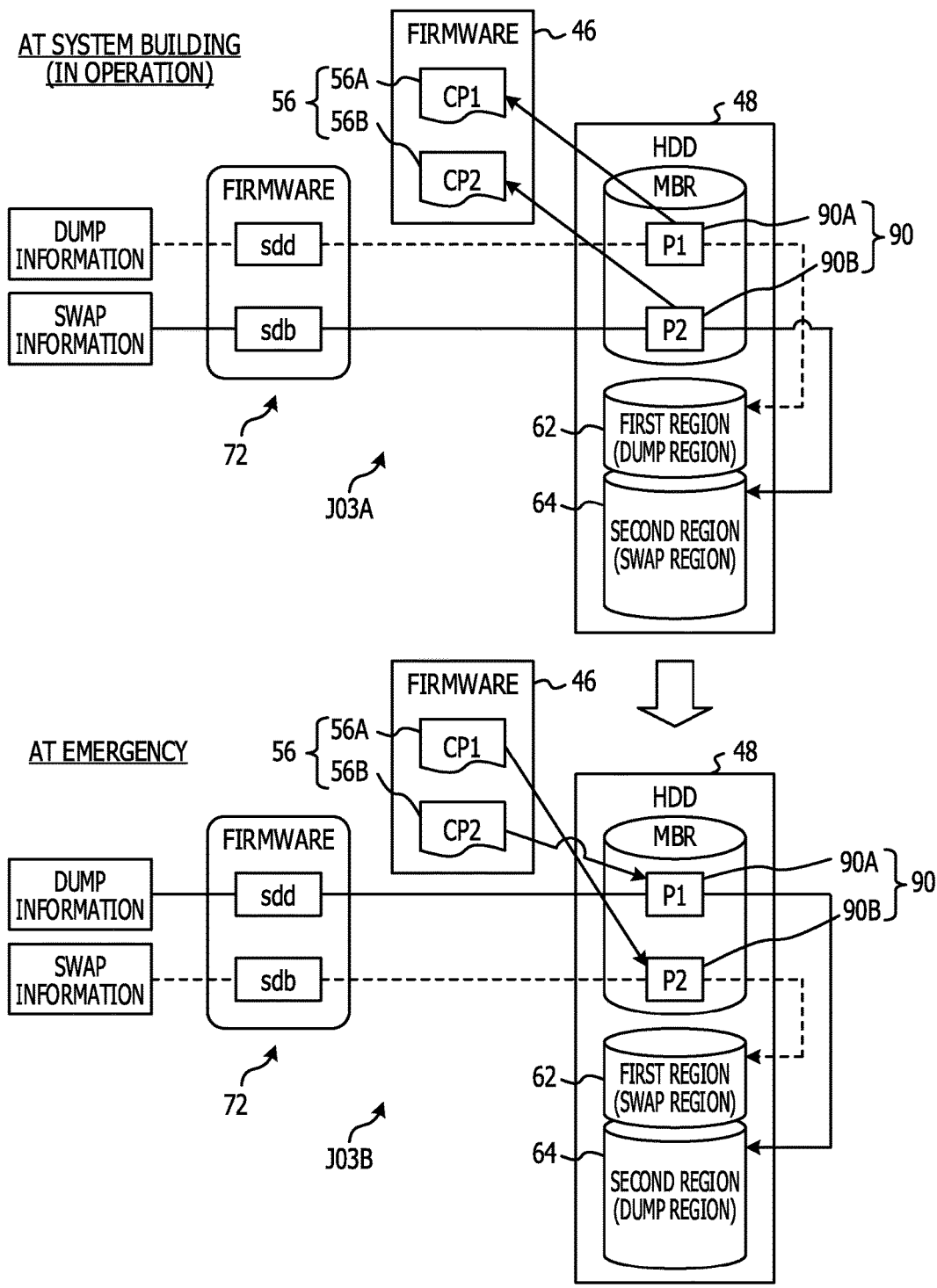
FIG. 12 is a block diagram illustrating rewriting processing which is performed by firmware.

FIG. 12 illustrates an example flow of information relating to the rewrite processing which is performed by the firmware 52. FIG. 12 illustrates a state J03A of the HDD 48 before executing the rewrite processing and a state J03B of the HDD 48 after executing the rewrite processing.

In the system building, the first region 62 is defined as the dump region and the second region 64 is defined as the swap region (state J03A). The location information 90A indicating the location of the first region 62 defined as the dump region on the HDD 48 is registered in the MBR. Also, the location information 90A of the first region 62 is stored in the first partition portion 56A of the partition information 56 stored in the nonvolatile memory 46 by the processing by the firmware 52. Similarly, the location information 90B indicating the location of the second region 64 defined as the swap region on the HDD 48 is registered in the MBR. Also, the location information 90B of the second region 64 is stored in the second partition portion 56B of the partition information 56 stored in the nonvolatile memory 46 by the processing of the firmware 52.

When the computer system 40 is in operation after the system building, the swap information 82 is stored in the second region 64 defined for the swap region or is read therefrom. In other words, in the computer system 40, the region to receive the swap information 82 becomes the second region 64 based on the location information 90B associated with the name of region sdb set by the PS 86, which is included in the configuration information.

When a failure occurs in the computer system 40, the firmware 52 executes the rewrite processing. In the rewrite processing by the firmware 52, the location information 90B of the second region 64 registered in the MBR in the HDD 48 is rewritten by the location information 90A of the first region 62 during the system building, which is stored in the nonvolatile memory 46. In other words, the partition table is rewritten. In addition, the location information 90A of the first region 62 registered in the MBR of the HDD 48 is rewritten by the location information 90B of the second region 64 during the system building, which is stored in the nonvolatile memory 46.

Accordingly, after the rewrite processing, the second region 64 in the HDD 48 is defined as the dump region and the first region 62 in the HDD 48 is defined as the swap region (state J03B). With this, the regions in the access destinations of the dump information 84 and the swap information 82 are switched with each other.

Hereinafter, further described is information acquisition processing of acquiring the dump information, such as emergency processing performed as dump processing when a failure occurs in the computer system 40.

Figure 13:
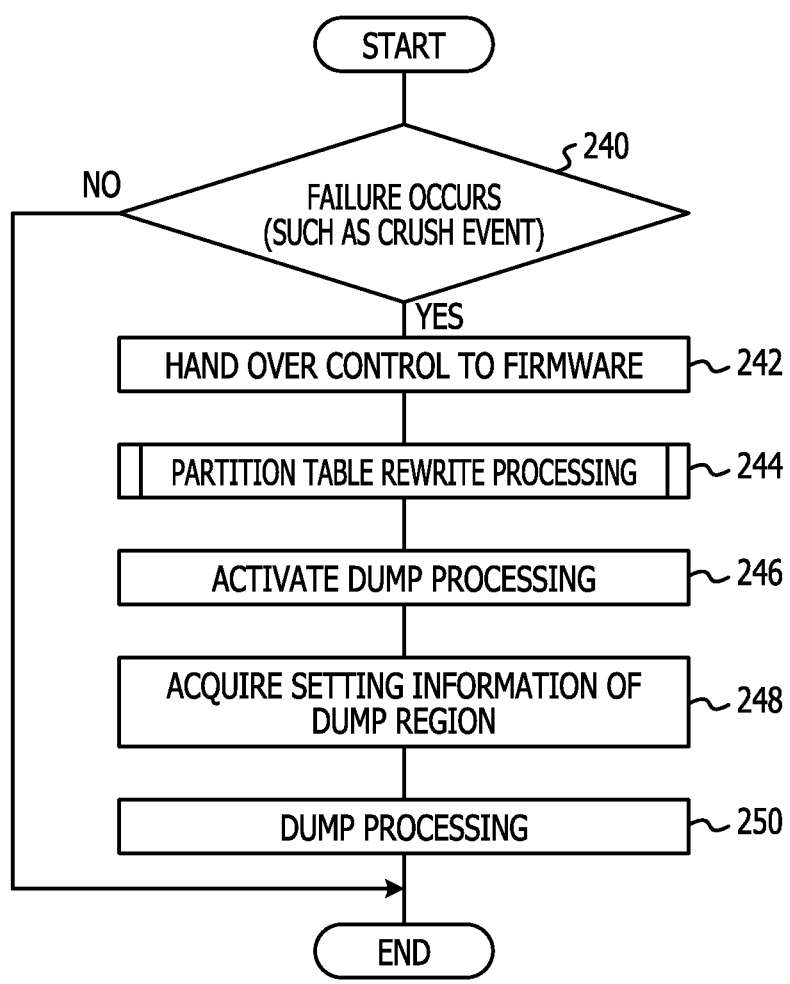
FIG. 13 is a flowchart illustrating an example flow of dump information acquisition processing.

FIG. 13 illustrates an example flow of the information acquisition processing of acquiring the dump information when dump processing is performed on the computer system 40. In the present embodiment, the CPU 42 executes the rewrite process 77 stored in the nonvolatile memory 46, so that the information acquisition processing routine in FIG. 13 is executed.

At step 240, the CPU 42 determines if a failure occurrence is detected. When the failure occurrence is not detected (No is determined at step 240), the present processing routine is finished. On the other hand, when the failure occurrence is detected (Yes is determined at step 240), at step 242, the control is taken over to the firmware 52. It is noted that, when a failure occurrence is detected, the CPU 42 may execute the processing routine in FIG. 13 by interruption processing. At step 244, the CPU 42 executes partition table rewrite processing which is performed by the firmware 52. After the partition table rewrite processing, the CPU 42 executes the information acquisition processing of acquiring the dump information. In other words, the CPU 42 activates the dump processing at step 246 and acquires the setting information of the dump region at step 248 and executes the dump processing at step 250. The dump processing is executed by the CPU 42 by reading the dump program 70 from the HDD 48.

Figure 14:
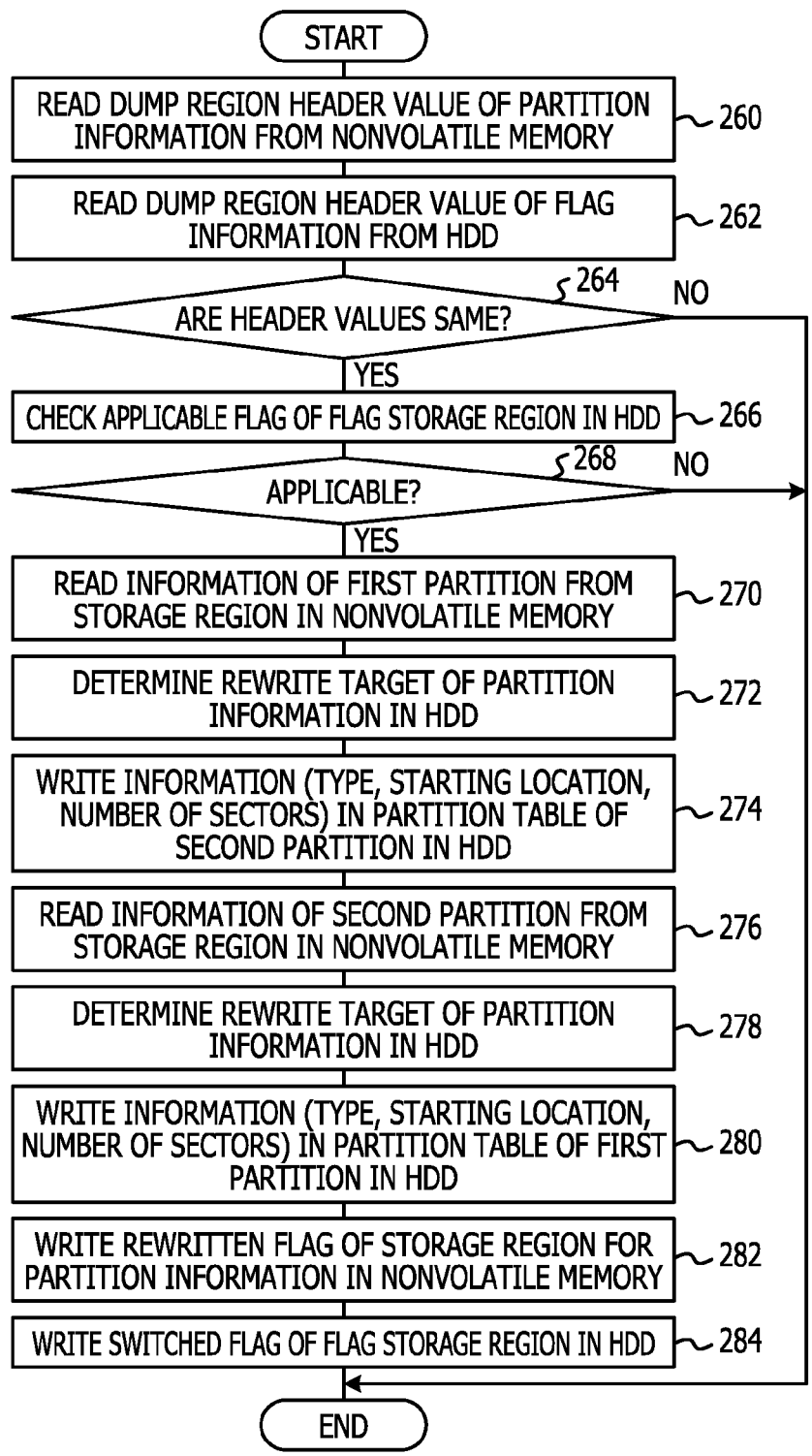
FIG. 14 is a flowchart illustrating an example flow of rewriting processing on a partition table.

FIG. 14 illustrates an example flow of the rewrite processing on the partition table defined in the HDD 48. At step 244 in FIG. 13, the processing routine in FIG. 14 is executed. At step 260, the CPU 42 reads the dump region header stored in the storage region 57 in the nonvolatile memory 46. At step 262, the CPU 42 reads the dump region header stored in the flag storage region 66 in the HDD 48. At step 264, the CPU 42 determines if the values of the dump region headers read at steps 260 and 262 are same. When Yes is determined at step 264, the processing proceeds to step 266, while when No is determined, the processing routine is terminated.

When the dump region header in the nonvolatile memory 46 and the dump region header in the HDD 48 are same (Yes is determined at step 264), at step S266, CPU 42 checks an applicable flag in the flag storage region 66 in the HDD 48. When the applicable flag is set, the partition table rewrite processing is applicable. Thus, the CPU 42 makes Yes determination at step 268 and proceeds the processing to step 270. On the other hand, when the applicable flag is not set, for example, in a case where the applicable flag is reset, at step 268, the CPU 42 makes No determination and terminates the processing routine.

At step 270, the CPU 42 reads information of the first partition, which is included in the partition information 56 in the storage region 57 in the nonvolatile memory 46. In other words, the CPU 42 reads the information of the first partition which is the first region 62 allocated as the dump region in the system building. After that, at step 272, the CPU 42 determines a rewrite target of the partition information in the HDD 48. Here, the other partition included in the partition information 56 in the storage region 57 in the nonvolatile memory 46, in short, the second partition is specified. At step 274, the CPU 42 writes the information (the type, starting location, and number of sectors) of the first partition in the system building, which is read at step 270, in the partition table of the second partition in the HDD 48.

After that, at step 276, the CPU 42 reads information of the second partition, which is included in the partition information 56 in the storage region 57 in the nonvolatile memory 46. In other words, the CPU 42 reads the information of the second partition which is the second region 64 allocated as the swap region in the system building. After that, at step 278, the CPU 42 determines a rewrite target of the partition information in the HDD 48. Here, the other partition included in the partition information 56 in the storage region 57 in the nonvolatile memory 46, in short, the first partition is specified. At step 280, the CPU 42 writes the information (the type, starting location, and number of sectors) of the second partition in the system building, which is read at step 276, in the partition table of the first partition in the HDD 48.

With the processing at steps 270 to 280, the two pieces of the location information of the two partitions stored in the MBR in the HDD 48 are switched with each other based on the two pieces of the location information which are copied to the nonvolatile memory 46.

After that, at step 282, the CPU 42 sets a written flag included in the partition information 56 in the storage region 57 in the nonvolatile memory 46. At step 284, the CPU 42 sets switched information included in the flag information 88 in the storage region 66 in the HDD 48. It is noted that by determining if the switched flag in the flag storage region 66 and the written flag in the storage region 57 in the nonvolatile memory 46 are set, duplicated operations of the partition table rewrite processing can be suppressed.

As described above, when the partition rewrite processing is terminated, the dump processing is performed based on the newly-rewritten partition information (steps 246 to 250 in FIG. 13). In other words, the partition which is the dump region stores is switched from the first partition with a capacity smaller than the memory capacity of the DRAM 44 to the second partition with a capacity equal to or larger than the memory capacity of the DRAM 44. Then, the dump information 84 is stored in the HDD 48.

Hereinafter, maintenance processing for the computer system 40 is described. In the present embodiment, described as one example of maintenance processing for the computer system 40 is a case where the HDD 48 including the dump region storing the dump information 84 is detached for checkup and the computer system 40 is restarted after the HDD 48 is exchanged with a new HDD.

It is noted that in the following description, to distinguish the HDD 48 storing the dump information 84 from a new HDD 48, the new HDD 48 is expressed by a HDD 48N. It is assumed here that the new HDD 48N includes a flag storage region 66 and an applicable flag of flag information 88 is set in advance.

When the HDD 48 is exchanged with a new HDD 48N, there may be a case where the new HDD 48 does not have a partition table such as a dump region in the HDD 48, and, thus, when it is tried to restart the computer system 40, an inconvenience occurs. In other words, the information relating to the swap region and the dump region in the HDD 48 is included in the configuration information 72 in the OS 86 in the HDD 48. Accordingly, to cause the new HDD 48N to operate similarly as the case when the HDD 48 is used, recovery processing of modifying partitions of the new HDD 48N and various pieces of information is generally performed. The recovery processing is performed in such a manner that the computer system 40 is activated by an administrator authority and modification or the like is performed on the setting information based on the information inputted by the administrator. However, the recovery processing which is accompanied by the modification operation by the input of the administrator authority of the computer system 40 may not only use time to the reactivation but also cause an inconvenience by a manually-made input. For this reason, in the maintenance processing for the computer system 40 in the present embodiment, recovery processing, such as crating partitions in a new HDD 48N is automatically executed.

Figure 15:
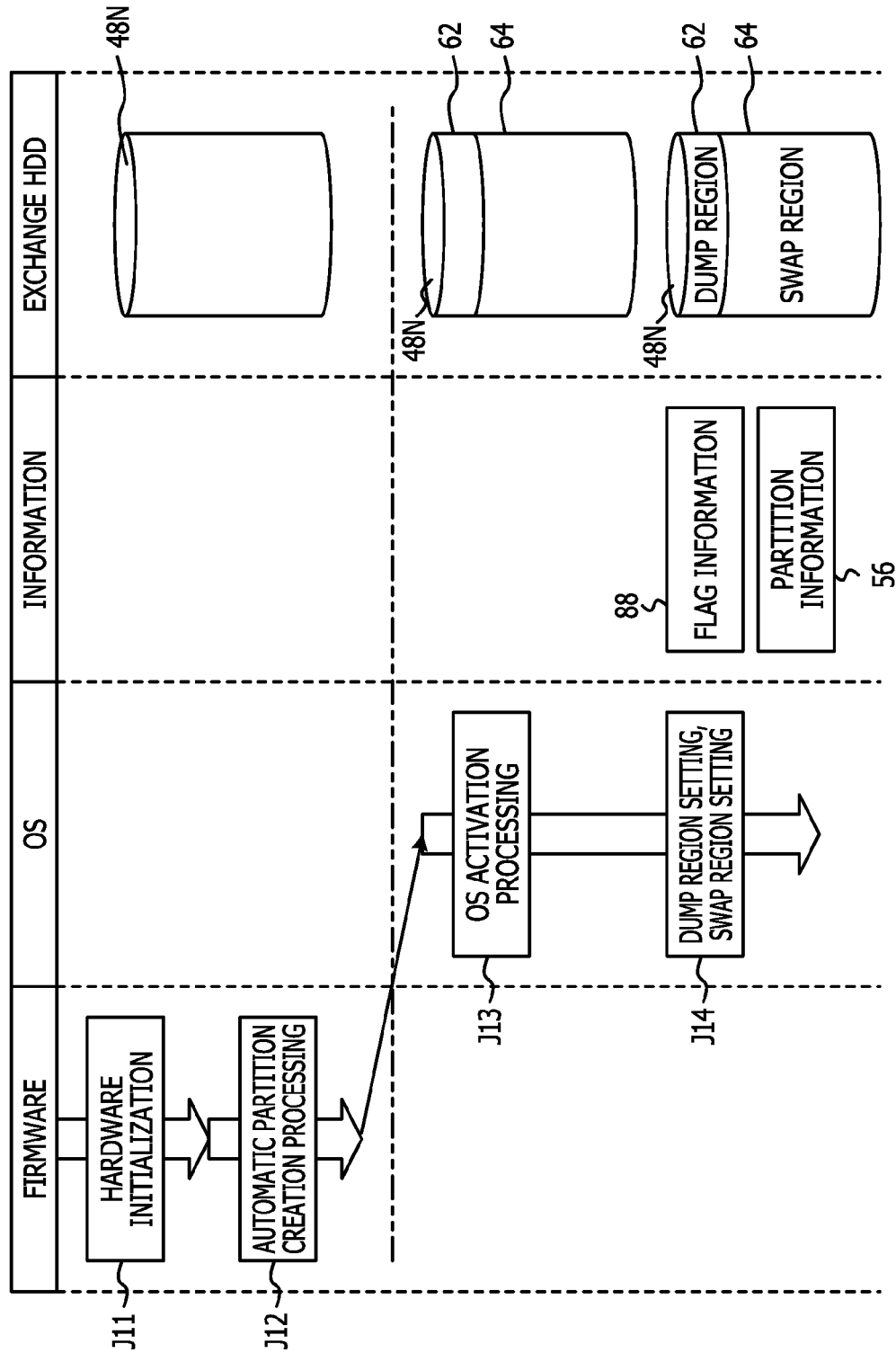
FIG. 15 is a block diagram illustrating processing related to maintenance of the computer system.

FIG. 15 illustrates an example flow of processing relating to maintenance for the computer system 40 according to the present embodiment. FIG. 15 illustrates the transition of states in the computer system 40 from the time when the HDD 48 is exchanged with the new HDD 48N to the time when the initial setting is completed.

After the dump information 84 is stored in the HDD 48 at the time of the dump processing on the computer system 40, the HDD 48 storing the dump information 84 is exchanged with the new HDD 48N. After the exchange operation of the HDD 48 is finished, the computer system 40 is activated and the firmware 52 executes the initialization processing on the hardware (state J11). During the state J11, partitions are not allocated to the HDD 48. Next, the firmware 52 executes automatic partition creation processing (J12) to allocate partitions to the HDD 48N. In other words, based on the information stored in the nonvolatile memory 46, a first partition which is the first region 62 and a second partition which is the second region 64 are set in the HDD 48N.

After that, the control is taken over from the CPU 42 to the OS 86, and the OS 86 is activated (state J13). Then, the OS 86 executes setting processing of a dump region and a swap region (state J14). In other words, the OS 86 executes setting processing of allocating the first region 62 as a dump region and the second region 64 as a swap region. In the setting processing, flag information 88 and partition information 56 are associated with each other. Accordingly, the configuration of the HDD 48, which includes the partition information 86 stored in the system building can be established in the HDD 48N, and, similar to the partitions used by the OS 86 before the exchange of the HDD 48, the HDD 48N can be restored.

Hereinafter, the maintenance processing for the computer system 40 is further described.

Figure 16:
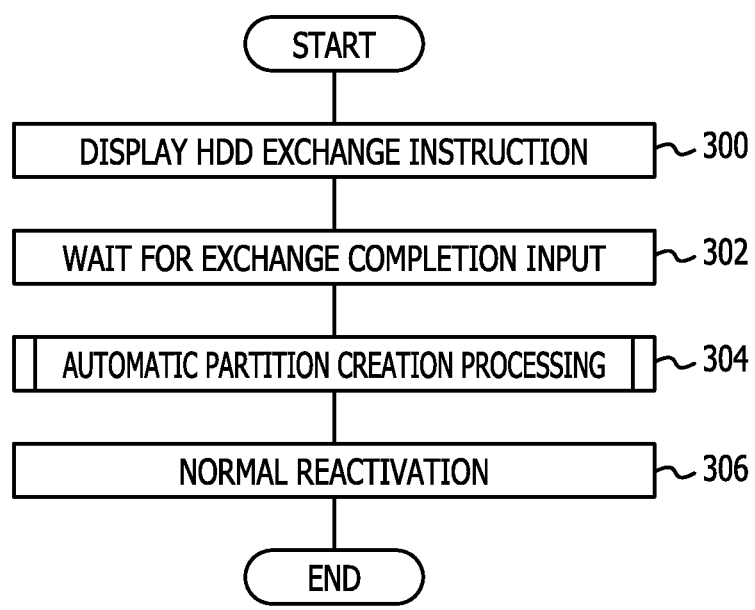
FIG. 16 is a flowchart illustrating an example flow of the maintenance processing.

FIG. 16 is an example flow of the maintenance processing for the computer system 40 according to the embodiment. In the present embodiment, after the CPU 42 stores the dump information 84 in the HDD 48 at the time of the dump processing, the creation process 78 stored in the nonvolatile memory 46 is executed and the maintenance processing routine in FIG. 16 is executed.

At step 300, the CPU 42 displays information prompting that the HDD 48 storing the dump information is detached and is exchanged with a new HDD 48N. After that, at step 302, the CPU 42 waits until an administrator inputs information indicating that the exchange of the new HDD 48N is completed. In other words, the administrator shuts down the power of the computer system 40, and, after the HDD 48 is detached and exchanged with the new HDD 48N, inputs, to the computer system 40, information indicating that the exchange of the new HDD 48N is completed. When the information indicating that the exchange of the new HDD 48 is completed is inputted, the processing is restarted from step 304 and the automatic partition creation processing is executed. At step 306, the CPU 42 reactivates the computer system 40. It is noted that the CPU 42 may display information indicating that the computer system 40 is reactivated to cause the administrator to operate.

Figure 17:
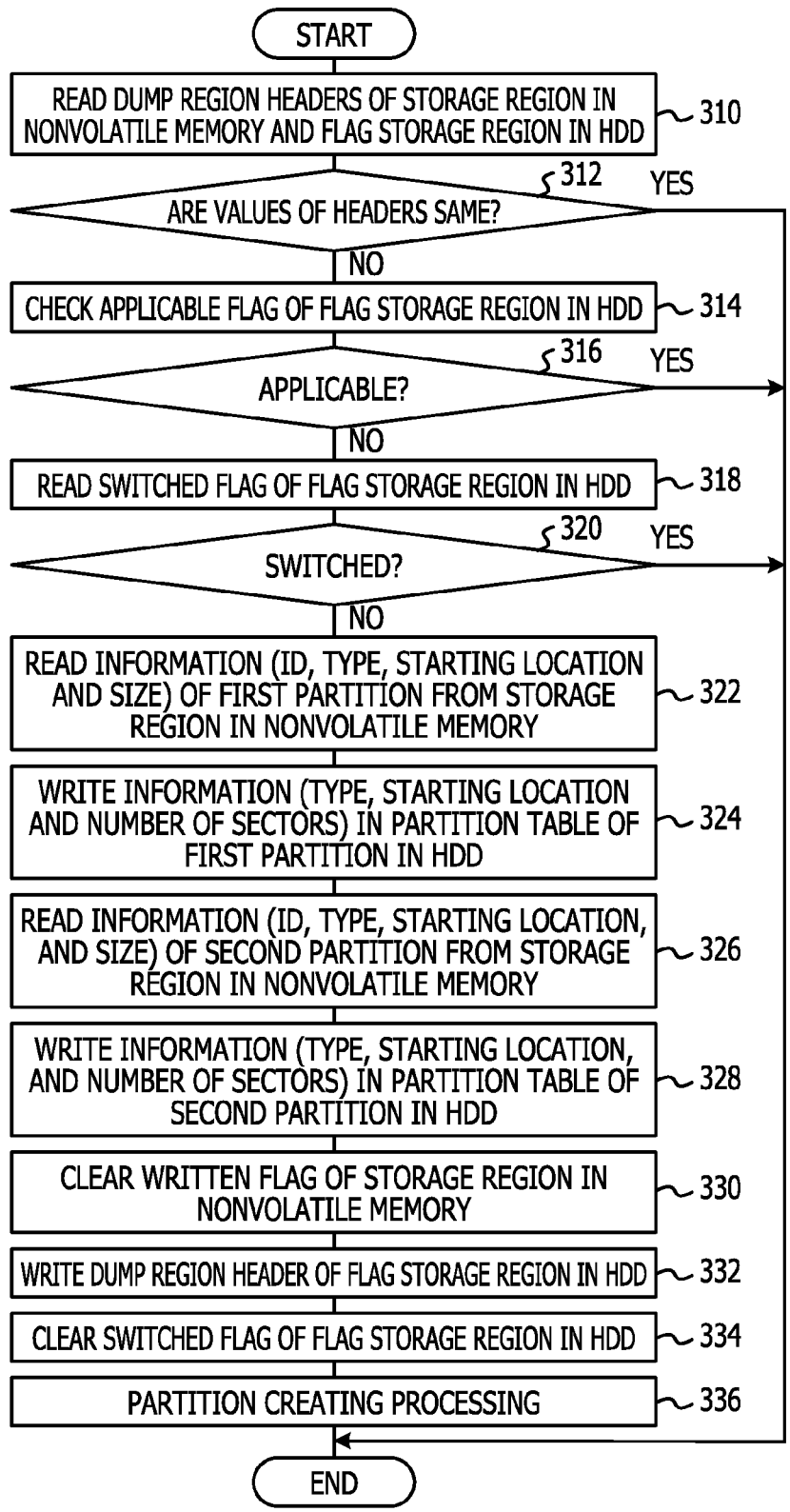
FIG. 17 is a flowchart illustrating a flow of automatic partition creation processing.

FIG. 17 illustrates a flow of automatic partition creation processing. At step 304 in FIG. 16, the processing routine in FIG. 17 is executed. At step 310, the CPU 42 reads the dump region header of the partition information 56, which is stored in the storage region 57 in the nonvolatile memory 46, and the dump region header of the flag information 88, which is stored in the flag storage region 66 in the HDD 48. At step 312, the CPU 42 determines if values of the dump region headers which are read at step 310 are same. When No is determined at step 312, the CPU 42 determines that an HDD with the same partition configuration as that of the partition information 56, which is stored in the storage region 57 in the nonvolatile memory 46, is not mounted, and proceeds the processing to step 314 to continue the processing. On the other hand, when Yes is determined by the CPU 42 at step 312, the present processing routine is terminated.

At step 314, the CPU 42 reads an applicable flag in the flag storage region 66 in the HDD 48 to check the applicable flag and, at step 316, determines if the applicable flag is set.

When the applicable flag is set (Yes is determined at step 316), the CPU 42 determines that initialization processing for automatically switching the HDD 48 is finished and partitions are already created. Then, the present processing routine is terminated. On the other hand, when the applicable flag is not set (No is determined at step 316), the CPU 42 proceeds the processing to step 318 to read the inputted flag in the flag storage region 66 in the HDD 48 and check the switched flag.

When the switched flag is set (Yes is determined at step 320), the CPU 42 determines that the partitions are already created and a preparation for storing the dump information 84 is finished. Then, the present processing routine is terminated. On the other hand, when the exchanged flag is not set (No is determined at step 320), the CPU 42 proceeds the processing to step 322.

At step 322, the CPU 42 reads information of the first partition, which is included in the partition information 56 in the storage region 57 in the nonvolatile memory 46. In other words, the CPU 42 reads the information indicating the ID, type, starting location, and size, which are stored as the information of the first partition information which is the first region 62 allocated as the dump region in the system building. After that, at step 324, the CPU 42 writes the information of the first partition (the type, starting location, the number of sectors) in the partition table of the first partition in the HDD 48 based on the information read at step 322.

After that, at step 326, the CPU 42 reads the information of the second partition included in the partition information 56 in the storage region 57 in the nonvolatile memory 46. In other words, the CPU 42 reads the information indicating the ID, type, starting location, and size, which are stored as the information of the second partition which is the second region 64 allocated as the swap region in the system building. After that, at step 328, the CPU 42 writes the information of the second partition (the type, starting location, the number of sectors) in the partition table of the second partition in the HDD 48 based on the information read at step 322.

At step 330, the CPU 42 clears the written flag included in the partition information 56 stored in the storage region 57 in the nonvolatile memory 46. At step 332, the CPU 42 writes the dump region header in the flag storage region 66 in the HDD 48. At step 334, the CPU 42 clears the switched flag in the flag storage region 66 in the HDD 48. At step 336, the CPU 42 executes the well-known partition creation processing based on the partition table written in the MBR at steps 324 and 328.

When the HDD is exchanged, the automatic partition creation processing is executed, so that partitions similar to those of the HDD 48 are allocated to the new HDD 48N and the new HDD 48N is recovered to operate. Also, when the computer system 40 is reactivated and the OS 86 is activated, the consistency of the setting in the new HDD 48N with the setting in the OS 86 can be maintained.

It is noted that the automatic partition creation processing illustrated in FIG. 17 is an example operation of a region definition unit of the disclosed technique. For example, the CPU 42 executes the automatic partition creation processing in FIG. 17, so that the CPU 42 operates as the region definition unit of the disclosed technique. In other words, the information processing apparatus 10 is achieved by the computer system 40 and the computer system 40 operates as the region definition unit by executing the automatic partition creation processing.

As described above, in the present embodiment, when a failure occurs in the computer system 40, the region on the HDD 48 which stores the dump information 84 is switched from the first region 62 for the dump region to the second region 64 for the swap region. Accordingly, in configuring the system of the computer system 40, it is only desired to define a region with a small capacity less than the memory capacity of the DRAM 44, as the first partition which is the first region 62 for the dump region. With this, when the computer system 40 normally operates, the region on the HDD 48 which stores the dump information 84 can be reduced.

Moreover, since the dump region can be reduced when the computer system 40 normally operates, the region in the HDD 48 can be effectively used as compared with the case when the dump region with a capacity equal to or larger than the memory capacity of the DRAM 44 is reserved in the HDD 48.

Also, in the present embodiment, when a failure occurs in the computer system 40, the settings for the regions on the HDD 48, of the first region 62 for the dump region and the second region 64 for the swap region, are exchanged with each other. Thus, each of the regions exists on the HDD 48. Accordingly, even when the computer system 40 is reactivated, the OS can detect the region for the dump region and the region for the swap region on the HDD 48. As a result, when the computer system 40 is reactivated, a failure due to an absence of the region on the HDD 48 can be avoided.

Also, when the computer system 40 is reactivated, the information stored in the region for the swap region is erased but the region set for the swap region is switched from the second region 64 to the first region 62 in the system building. Accordingly, the dump information 84 stored in the second region 64 is not erased.

In the present embodiment, the HDD 48 is provided with the flag storage region 66 which records the information indicating if the processing of rewriting the settings of the regions on the HDD 48, of the first region 62 for the dump region and the second region 64 for the swap region, is applied or not applied. Accordingly, the duplicated processing of rewriting again the settings of the regions on the HDD 48, of the first region 62 for the dump region and the second region 64 for the swap region, can be avoided.

In the present embodiment, the nonvolatile memory 46 is provided with the storage region 57 storing the partition information 56 so as to store the information of the second region 64 which is set on the HDD 48 in the system building. Accordingly, the location information for the dump region on the HDD 48 can be properly rewritten by the information indicating the setting of the region on the HDD 48, of the second region 64 stored in the nonvolatile memory 46.

In the present embodiment, the nonvolatile memory 46 is provided with the storage region 57 storing the partition information 56 so as to further store the information of the first region 62 set on the HDD 48 in the system building. Accordingly, the location information for the dump region in the HDD 48 can be properly rewritten by the location information for the swap region.

In the present embodiment, the nonvolatile memory 46 records the information indicating if the processing of rewriting the settings of the regions on the HDD 48, of the first region 62 for the dump region and the second region 64 for the swap region, is executed or not executed. Accordingly, the duplicated processing of performing, on the HDD 48, the rewriting of the settings of the first region 62 for the dump region and the second region 64 for the swap region can be avoided.

In the present embodiment, when the HDD 48 is exchanged with the new HDD 48N, to cause the new HDD 48N to operate similarly as the HDD 48 in the system building, partitions similar to those of the HDD 48 are allocated in the system building. Accordingly, the new HDD 48N is recovered to a state similar as that of the HDD 48 in the system building. In addition, when the computer system 40 is reactivated and the OS 86 is activated, the consistency with the setting in the OS 86 is maintained.

In the present embodiment, the HDD 48 is used as an auxiliary storage device storing the dump information 84. Accordingly, even when a memory capacity of the DRAM 44, which is the main storage device, increases, the region can be easily expanded. Also, the information based on the partition table indicating the regions on the HDD 48 is stored in the nonvolatile memory 46. Accordingly, even after the power of the computer system 40 is shut down, the information based on the partition table is not erased. In the present embodiment, the information indicating the partition table stored in the MBR of the HDD 48 is used to rewrite the settings of the regions on the HDD 48, of the first region 62 for the dump information and the second region 64 for the swap region. Consequently, the regions on the HDD 48, which store the dump information 84, can be switched without affecting the operation of the OS.

Also, in the present embodiment, the firmware 52 performs the processing of switching the settings of the regions on the HDD 48, of the first region 62 for the dump region and the second region 64 for the swap region, so that the effect by the OS 86 can be suppressed.

Described in the present embodiment is the case where, when the dump information 84 is stored when a failure occurs in the computer system 40, the regions are switched by rewriting the settings of the first region 62 for the dump region and the second region 64 for the swap region. However, the disclosed technique is not limited to the case where the region for the dump region and the region for the swap region on the HDD 48 are switched. For example, when the dump information 48 is stored, it is only desired that at least the dump information 84 can be stored. Accordingly, the setting can be rewritten for the region storing the dump information 84. In the case of rewriting the setting for the region storing the dump information 84, there is a case where the information in the second region 64 for the swap region may be erased after the computer system 40 is reactivated. Therefore, it is preferable that the HDD 48 is detached after the dump information 84 is stored.

Described in the present embodiment is the case where the setting is rewritten so that the second region 64 for the swap region is used as a region storing the dump information 84. However, the disclosed technique is not limited to the region for the swap region on the HDD 48. For example, the setting may be rewritten so that an unused region on the HDD 48 is used as a region storing the dump information 84.

Second Embodiment

Figure 18:
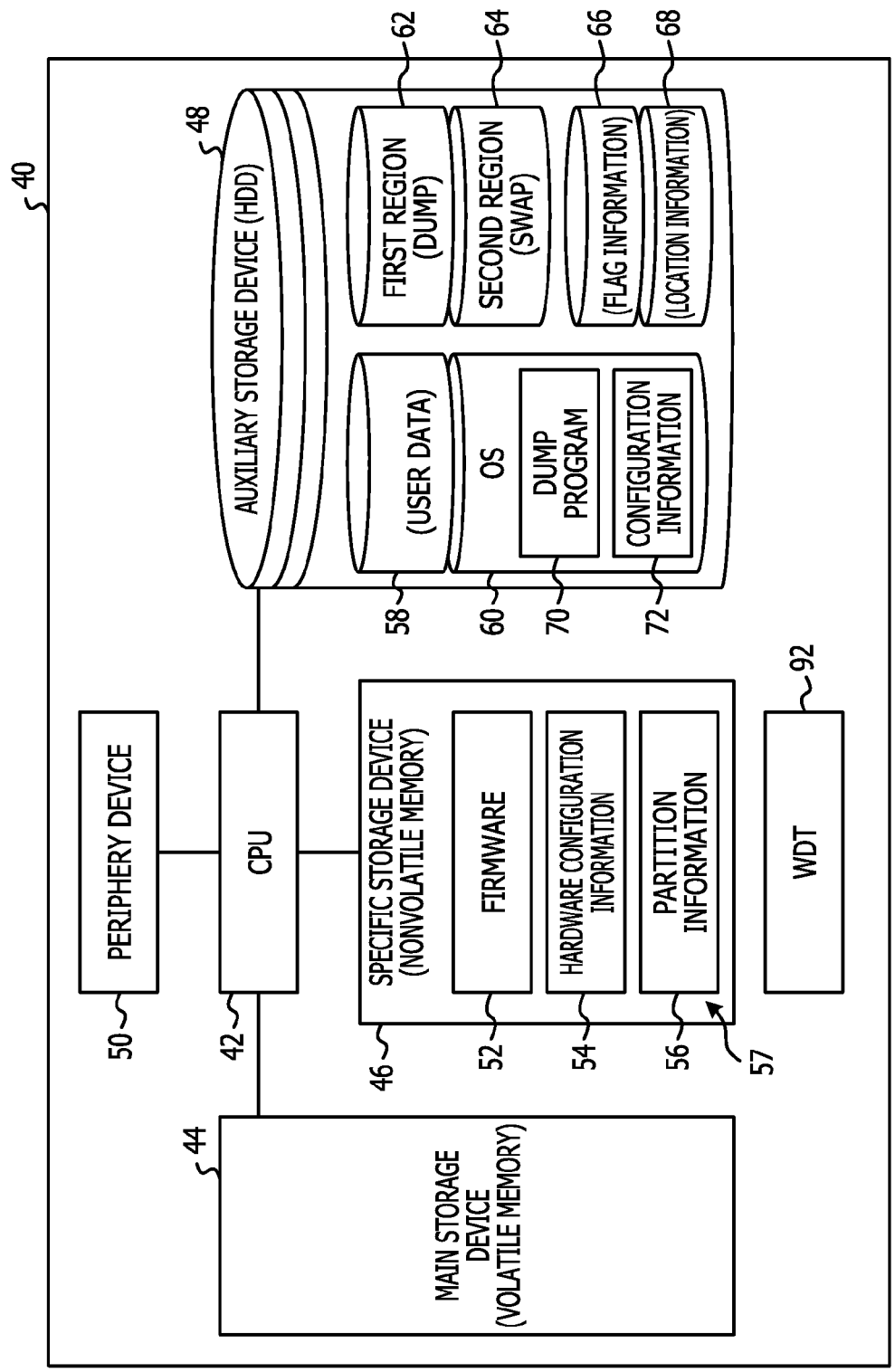
FIG. 18 is a block diagram illustrating a configuration example of an information processing apparatus according to a second embodiment.

Referring to FIG. 18, the present embodiment describes a modified example of a case where a failure occurrence is detected in a computer system 40. It is noted that a second embodiment has the configuration almost same as that of the first embodiment. In addition, same reference numerals are given to denote same portions, and the detailed description thereof is omitted.

Described in the first embodiment is the case where the CPU 42 detects an occurrence of a failure such as a crush. However, there is a case where the CPU 42 has difficulty in continuing the processing by the CPU 42 due to an occurrence of a fault relating to the CPU 42 or the like in the computer system 40. For this reason, as illustrated in FIG. 18, the computer system 40 is provided with a monitoring unit 92 configured to monitor an operation of the CPU 42 in the computer system 40. It is noted that the monitoring unit 92 is expressed as WDT 92 in FIG. 18. The monitoring unit 92 includes a timer and monitors if the CPU 42 operates regularly. An example of the monitoring unit 92 includes a watchdog system.

Hereinafter, an operation of the present embodiment is described.

The second embodiment is different from the first embodiment in, not that the CPU 42 detects an occurrence of a failure in the computer system 40 (step 240 in FIG. 13), but that the monitoring unit 92 detects an occurrence of a failure. In other words, in the present embodiment, when a failure occurs in the computer system 40 while the CPU 42 has difficulty in continuing the processing, the monitoring unit 92 detects the failure occurrence. Then, at step 242, the control is taken over from the monitoring unit 92 to the firmware 52 and the firmware 52 executes partition table rewrite processing (see FIG. 14).

As described above, in the second embodiment, even when the CPU 42 has difficulty in continuing the processing due to an occurrence of a fault relating to the CPU 42 or the like, the region on the HDD 48, which stores the dump information 84, can be switched.

It is noted that described in the above-described embodiment is the example that the information processing apparatus 10 is achieved by the computer system 40. However, the present embodiment is not limited to this configuration. Various improvements and modifications may be, of course, made without departing from the content of the description described above.

Also, described in the above embodiment is an aspect that a program is stored in a nonvolatile memory or an HDD in advance. However, the configuration is not limited to this configuration. For example, the program in the disclosed technique may be provided in the form of being recorded in a recording medium such as a CD-ROM or a DVD-ROM.

All publications, patent applications, and technical standards, to the same extent as if the documents each, patent applications, and technical standards are incorporated by reference marked individually and specifically described herein, and is incorporated by reference herein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a processor configured to perform data processing;
a first memory coupled to the processor and configured to store processing data obtained by the data processing performed by the processor; and
a second memory coupled to the processor,
wherein a first data storage region is set in the second memory and a second data storage region not overlapping with the first data storage region is set in the second memory, the second data storage region having a second data capacity and the first data storage region having a first data capacity smaller than the second data capacity, and
the processor is configured to,
when the information processing apparatus operates normally, select the second data storage region as a storage region for data to be written from the first memory to the second memory by swap processing, and select the first data storage region as a storage region for data to be written from the first memory to the second memory by dump processing, and
when a failure occurs in the information processing apparatus, select the second data storage region as the storage region for data to be written from the first memory to the second memory by the dump processing.

2. The information processing apparatus according to claim 1, wherein
a third data storage region is set in the second memory, the third data storage region being configured to store region data indicating the storage region for the processing data to be written from the first memory to the second memory in the swap processing, and the processor is configured to, when a failure occurs in the information processing apparatus, write first region data indicating the first storage region as the region data in the third data storage region, and when the information processing apparatus operates normally, write second region data indicating the second data storage region as the region data in the third data storage region.

3. The information processing apparatus according to claim 2, wherein a flag region is set in the second memory, the flag region being configured to store a flag indicating a content of the region data stored in the third data storage region, and the processor is configured to rewrite the region data based on the flag stored in the flag region.

4. The information processing apparatus according to claim 1, wherein the second data capacity is larger than a capacity of the first memory.

5. The information processing apparatus according to claim 1, wherein the first memory is a volatile memory, and the second memory is a non-volatile memory.

6. The information processing apparatus, according to claim 1, wherein the first data capacity is smaller than a capacity of the first memory.

7. An information processing method using an information processing apparatus including a processor, a first memory, and a second memory, the information processing method comprising:

setting a first data storage region and a second data region not overlapping with the first data storage region in the second memory, the second data storage region having a second data capacity and the first data storage region having a first data capacity smaller than the second data capacity;

performing data processing using the processor and storing processing data in the first memory;

when the information processing apparatus operates normally, selecting the second data storage region as a storage region for data to be written from the first memory to the second memory by swap processing, and selecting the first data storage region as a storage region for data to be written from the first memory to the second memory by dump processing; and when a failure occurs in the information processing apparatus, selecting the second data storage region as the storage region for data to be written from the first memory to the second memory by the dump processing.

8. The information processing method according to claim 7, the method further comprising:

setting a third data storage region in the second memory, the third data storage region being configured to store region data indicating the storage region for the processing data to be written from the first memory to the second memory in the swap processing;

when a failure occurs in the information processing apparatus, writing first region data indicating the first storage region as the region data in the third data storage region; and when the information processing apparatus operates normally, writing second region data indicating the second data storage region as the region data in the third data storage region.

9. The information processing method according to claim 8, the method further comprising:

setting a flag region in the second memory, the flag region being configured to store a flag indicating a content of the region data stored in the third data storage region; and rewriting the region data based on the flag stored in the flag region.

10. The information processing method according to claim 7, wherein the second data capacity is larger than a capacity of the first memory.

11. The information processing method according to claim 7, wherein the first memory is a volatile memory, and the second memory is a non-volatile memory.

12. The information processing method according to claim 7, wherein the first data capacity is smaller than a capacity of the first memory.

13. A non-transitory computer-readable storage medium storing a program that causes an information processing apparatus to execute a process, the information processing apparatus including a processor, a first memory, and a second memory, the process comprising:

setting a first data storage region and a second data storage region not overlapping with the first data storage region in the second memory, the second data storage region having a second data capacity and the first data storage region having a first data capacity smaller than the second data capacity;

performing data processing by using the processor and storing processing data in the first memory;

when the information processing apparatus operates normally, selecting the second data storage region as a storage region for data to be written from the first memory to the second memory by swap processing, and selecting the first data storage region as a storage region for data to be written from the first memory to the second memory by dump processing; and when a failure occurs in the information processing apparatus, selecting the second data storage region as the storage region for data to be written from the first memory to the second memory by the dump processing.

* * * * *